(12) United States Patent
Truong Dinh et al.

(10) Patent No.: US 7,928,183 B2
(45) Date of Patent: Apr. 19, 2011

(54) GLYCEROL POLYCARBONATE POLYESTERS AND OTHER POLYHYDROXYLATED POLYMERS AND COPOLYMERS, ACETYLATION METHOD AND APPLICATIONS

(76) Inventors: Nguyen Truong Dinh, St. Laurent D'Agny (FR); Zephirin Mouloungui, Toulouse (FR); Philippe Marechal, Toulouse (FR)

( * ) Notice: Subject to any disclaimer, the term of this patent is extended or adjusted under 35 U.S.C. 154(b) by 628 days.

(21) Appl. No.: 11/794,111

(22) PCT Filed: Dec. 22, 2005

(86) PCT No.: PCT/FR2005/003244
§ 371 (c)(1),
(2), (4) Date: May 8, 2008

(87) PCT Pub. No.: WO2006/090022
PCT Pub. Date: Aug. 31, 2006

(65) Prior Publication Data
US 2009/0036642 A1  Feb. 5, 2009

(30) Foreign Application Priority Data
Dec. 23, 2004 (FR) ..................... 04 13826

(51) Int. Cl.
*C08G 64/00* (2006.01)
*C08G 63/02* (2006.01)
(52) U.S. Cl. .................. 528/370; 528/176; 528/296
(58) Field of Classification Search .................. 528/176, 528/296
See application file for complete search history.

(56) References Cited

U.S. PATENT DOCUMENTS 3,637,774 A * 1/1972 Babayan et al. ............... 521/172
5,721,305 A * 2/1998 Eshuis et al. .................. 524/442

OTHER PUBLICATIONS

William C. Ray, III et al. Polycarbonate and Poly(carbonate-ester)s Synthesized from Biocompatible Building Blocks of Glycerol and Lactic Acid Departments of Chemistry, Ophthalmology, and Biomedical Engineering, Macromolecules, 2003, 36 (10), pp. 3557-3562.*

* cited by examiner

*Primary Examiner* — Terressa M Boykin
(74) *Attorney, Agent, or Firm* — McCarter & English LLP

(57) ABSTRACT

The invention relates to polyesters containing at least one partly acylated polyhydroxylated compound belonging the group consisting of glycerol polycarbonates, specific polyglycerols, [(a-hydroxymethyl) oxyethylene/(a-hydroxymethyl)ethylene carbonate] copolymers, [a -hydroxymethyl) oxyethylene/(a-hydroxymethyl)ethylene carbonate] copolymers, and [a -alkyl) oxyethylene/(a-hydroxyalkyl) oxyethylene] copolymers. The invention also relates to methods for acylating, at least partly, the polyhydroxylated compounds. The polyesters of this invention are applicable to the technical fields relating to engine and industrial lubricants, greases, hydraulic fluids, metal deformation and processing lubricants, stripping and mold dressing products, oil prospecting, mines, tunnel borers, cosmetics, detergency, inks, textile coatings and papers, to the field of food products, to the protection of wood as synthesis intermediates.

45 Claims, No Drawings

GLYCEROL POLYCARBONATE POLYESTERS AND OTHER POLYHYDROXYLATED POLYMERS AND COPOLYMERS, ACETYLATION METHOD AND APPLICATIONS

FIELD OF THE INVENTION

This invention relates to polyesters of at least one of the polyhydroxylated compounds, at least partially acylated, i.e. partially or entirely acylated, belonging to the group consisting of polyhydroxylated compounds, which are glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers.

The invention relates in particular to glycerol polycarbonate polyesters and/or at least partially acylated specific polyglycerols.

The invention also relates to polyesters of polyhydroxylated compounds in a mixture in an organic composition including glycerol polycarbonates, specific polyglycerols and [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers, optionally in the presence of glycerol carbonate and/or other organic carbonates and glycerol, of which at least one of said polyhydroxylated compounds is at least partially acylated.

The invention also relates to a catalytic or non-catalytic method for at least partial acylation of at least one of the polyhydroxylated compounds belonging to the group consisting of glycerol polycarbonates, specific polyglycerols, [(α-hydroxymethyl) oxyethylene/(α-hydroxymethyl) ethylene carbonate] copolymers, [(α-hydroxyalkyl) oxyethylene/ (α-alkyl) ethylene carbonate] copolymers, and [(α-alkyl) oxyethylene/(α-hydroxyalkyl) oxyethylene] copolymers, i) after their selective separation when they are initially in a mixture, or ii) in a mixture, optionally with glycerol carbonate and/or other organic carbonates, glycerol and/or other coproducts and/or residual compounds before acylation, wherein said at least partial acylation is followed by a separation extraction of each of the at least partially acylated compounds.

The invention also relates to a method for extracting each constituent of the organic composition, i) before acylation, followed by the at least partial acylation of the constituent extracted from the organic composition, ii) after at least partial collective acylation of at least one of the constituents of the mixture.

The invention finally relates to the use and application in numerous fields of the at least partially acylated organic composition, or of each of its at least partially acylated constituents, owing to numerous specific properties, but in particular their lipophilic or lipid-soluble character.

PRIOR ART

For a long time, with more or less success, industries have attempted to replace the raw materials from the oil industry or the chemical industry by transforming them into finished products, either into new molecules, or into new use formulations for various technical or economic purposes. Recently, the reinforcement of environmental constraints in Europe, in particular in the protection of aqueous environments (Ecolabel, Blue Angel, Wasser Gafahrdung Klasse classification, etc.) and air (Kyoto Protocol, etc.) and toxicological protection (Biocide guidelines, European REACH project, etc.) have done more than to focus research in a new direction, that of organic products from forestry and in particular agriculture operations, also called "agromolecules". These are particularly beneficial because they are completely natural, non-toxic, biodegradable, with a balanced carbon footprint, and in particular because they are renewable. This route is also heavily promoted especially in developed countries because, for the first time, it is giving agriculture a beneficial and concrete industrial outlet, potentially with an alternative to fossil resources.

First among these available "agromolecules" are "vegetal oils" or animal oils, i.e. fats, which have been used since antiquity. These fats are fatty acid esters and glycerol or triacylglycerols, i.e. having long-chain carbonated fatty acids, saturated or not, with one or more unsaturations and other hydroxyl, epoxide or other functions. Previously, they were used "as is", or as "supports" or additives in complex use formulations. However, owing to technological developments, it is possible today to transform them into bio-fuels, bio-solvents, bio-detergents, bio-lubricants, bio-plastics, bio-materials in a very wide variety of fields.

Among the "richest" and most commonly used transformation methods, esterification has a privileged place because esterification is regioselective and essentially affects the carboxylic centres of fatty acids or the carboxyester centres of fatty acids, triglycerides and the hydroxyl centres of monoalcohols or polyols. This results in structural and functional chemical modifications of the organic molecule of the fatty esters created. Therefore, with this esterification technique, and using these vegetal oils, it is possible to overcome certain intrinsic defects or to provide new use properties.

Such esters have been described in numerous articles and studies, but are included among those used for illustrative purposes only for a few significant applications, as bio-lubricants.

Esters resulting from the esterification of fatty monoacids with neopentyl polyols in order to produce neopentyl polyol esters constitute lubricating bases, in particular for aviation turbojets (Neopentyl polyol ester-based lubricants. OCL—vol. 3, no. 1, January/February 1996—p. 57 to 63 and Total or Partial Erucate of Pentaerythritol JAOCS Vol. 75 No. 2, 1998, p. 293 to 299).

In addition, the conditions of esterification of fatty acids have also been the subject of publications, in particular $C_8$ to $C_{20}$ dicarboxylic acids, of which the esters are intended for lubricating bases (Fatty Acids in Industry edited by Robert W. Johnson Earl Fritz pages 327 to 349). This esterification is performed in the presence of suitable catalysts, such as acids ($H_3PO_4$, $H_2SO_4$, R—$SO_3H$), superacids ($HClO_4$, $ClSO_3H$, $HSO_3F$, $CF_3SO_3H$ and others) (Erdöl und Kohle—Erdgas Petrochimie Vereinigt mit Brennstoff—Chemie: part I pages 244 to 248).

Finally, catalytic esterification in the presence of acid catalysts (paratoluene sulphonic acid, sulphuric acid or others), alkaline catalysts (metal acetate, metal oxide and others) is also mentioned in the prior art (Transesterification of Junzo OTERA—American Chemical Society—Chemical Reviews 1993—vol. 93, no. 4, p. 1449 to 1470).

In addition to their inherent biodegradation and non-toxicity (oleochemical esters—environmentally compatible raw materials for oils and lubricants from renewable resources. Fett/Lipid, vol. 101, no. 6, S. 1999, p. 192 to 198), these modified esters are particularly effective for lubrication (friction modifier, anti-wear), low-temperature rheology (freezing point at negative temperature) and high-temperature rheology (little variation between high and mid-temperature, demonstrated by a high viscosity index), oxidation and temperature stable, thermally stable, comparatively fire resistant with respect to counterparts in the oil industry.

These esters, often called "polyesters" are in fact "simple" polyfunctional molecules with a plurality of ester functions, with a maximum number of four, after esterification on a polyol, with a plurality of alcohol functions, and not on polymers, in the sense of macromolecules, with the exception of two categories of products, which are complex esters resulting from esterification with a diacid and polyglycerol esters, with polyglycerol being a polymer.

In all of the "polyols" used for the esterification of these fatty acids, only molecules with a plurality of alcohol functions, such as polyglycerols, i.e. a polymer with a plurality of alcohol functions, are mentioned.

However, it is known that prior art documents describe methods for obtaining polyglycerol by catalytic polymerisation of glycerol, followed by esterification.

A first document (U.S. Pat. No. 3,637,774) describes a method for catalytic preparation of polyglycerols, which consists of polymerising the glycerol by condensation, with elimination of the water formed, at a temperature above 100° C. in the presence of an alkaline catalyst, wherein the polyglycerol obtained satisfies the formula:

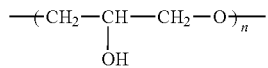

However, the polyglycerol mass formed by the polymerisation appears to be a homogeneous mixture of glycerol oligomers, because it is constituted by a single type of polymer, and it can be esterified by means of an organic acid.

Another document (U.S. Pat. No. 5,721,305) also describes a method for catalytic polymerisation of glycerol or some of its derivatives, such as glycidol or glycerol carbonate in a mixture with glycerol at atmospheric pressure and at a temperature between 150° C. and 350° C. The mass resulting from the polymerisation is a mixture of glycerol oligomers of which some can be monocarbonated glycerol oligomers. This mixture that thus appears, formed by a single type of polymer, is a homogeneous mixture that can easily be esterified in this mixture state.

Another document, RAY C. R. III, GRINSTAFF M. W.: "Polycarbonate and Poly(carbonate-ester)s synthesized from biocompatible building block of glycerol and lactic acid", MACROMOLECULES, vol. 36, 2003, pages 3557-3562, XP002340308, is a scientific publication that relates to the synthesis and characterisation of a very specific polycarbonate and a poly(carbonate-ester) by a reaction with lactic acid.

According to this document, it appears that the monomer used to produce a polycarbonate is specific and complex. Indeed, this monomer is "5-benzyloxy-1-3-dioxan-2-one", which is a six-membered cyclic carbonate, specially prepared by a two-step method, and which cannot be confused with the cyclic glycerol carbonate monomer, which is five-membered by definition.

In addition, this monomer has a "benzyl" protective group throughout the entire polymerisation reaction. Thus, such specific and complex monomers and the associated polymerisation process provides no possibility for industrial-scale economic development of what appears to be a laboratory process.

Finally, one of the repeated basic patterns is that of the polycarbonate, which satisfies the general formula:

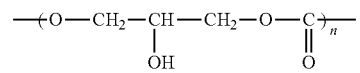

This pattern appears to be the poly(2-hydroxy 3-oxo propyl ester) and not the glycerol polycarbonate, as the other associated pattern is that of lactic acid, and the polymerisation is performed with lactic acid and not carbonate.

But in all of the polyols used for the esterification of fatty acids, polymers and/or copolymers based on five-membered cyclic glycerol carbonate and glycerol are not mentioned.

However:

Glycerol is an organic compound produced in large amounts during industrial-scale transformations of oils and fats into soaps, fatty acids, fatty esters and in particular, fatty acid methyl esters. The last is produced to develop bio-fuels.

Glycerol thus appears to be an available and beneficial raw material due to its low cost and its intrinsic properties.

Glycerol can be transformed by heterocyclisation into glycerol carbonate with a higher added value (U.S. Pat. No. 2,915,529, EP 0739888, FR 2 778 182) for applications in which glycerol carbonate is shown to excel owing to its excellent intrinsic properties. Glycerol carbonate is a compound that is:

bifunctional, which enables it to act as a solvent with respect to numerous organic or inorganic compounds, non-toxic with a high boiling point, capable of being used as a polymer stabiliser and a synthesis intermediate in organic reactions such as esterifications, transesterifications, carbamoylation and other reactions, capable of being used in numerous fields such as cosmetics, pharmacy, food.

Glycerol can also be transformed into glycerol carbonate polymers and/or copolymers which are polyhydroxylated compounds having important intrinsic properties such as multifunctionality, an absence of toxicity and ecotoxicity, biodegradability, tribological properties, thermal stability and good oxidation and hydrolysis resistance, a high wetting power, rheological properties, electrical properties, and hydrophilic properties that make them water-soluble, among others.

Such polymers and/or copolymers were described in the French patent application (FR 0408796) as polyhydroxylated compounds and a catalytic polymerisation method for obtaining them in the form of a mixture of polymers and/or copolymers in an organic composition, but their transformation into esters and their use as such do not appear to be disclosed in the prior art.

OBJECTIVES OF THE INVENTION

Therefore, the invention proposes:

creating a method for at least partial acylation of at least one polyhydroxylated compound belonging to the group consisting of glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers, and for obtaining said desired at least partially acylated polyhydroxylated compound.

creating a method for at least partial acylation of at least one polyhydroxylated compound belonging to the specific group mentioned above, found in a mixture in an organic composition formed by glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers, optionally in the presence of glycerol carbonate and/or other organic carbonates, and glycerol and/or other coproducts and/or residual compounds.
  i) after their selective separation when these various compounds are initially in a mixture or
  ii) in a mixture, followed by a separation extraction of each of the at least partially acylated compounds.

creating a method for extracting each constituent from the organic composition,
  i) before the acylation, followed by the at least partial acylation of the constituent extracted from the organic composition,
  ii) after at least partial collective acylation of the constituents of the mixture.

transforming the polyhydroxylated compounds belonging to the aforementioned selected group into simple, mixed, complex, partial, total, intermolecular or intramolecular polyesters, by simple, complex, partial and total acylation, having polyesters including the polyhydroxylated polymers and copolymers belonging to the aforementioned selected group, transformed by acylation as products, having synthesis intermediates including the polyesters of specific polyglycerols, glycerol polycarbonates and copolymers, all of which at least partially acylated;

showing the main applications of said polyesters including the at least partially acylated polymers and/or copolymers belonging to the aforementioned selected group.

SUMMARY OF THE INVENTION

In the invention, and throughout the description, the term acylation will be used to refer to the substitution of an acyl radical Y—R—CO— for a hydrogen, not directly bonded to a carbon, wherein the acyl compound is represented by the formula Y—R—CO—X, in which X can be —OH (acid)- O—CO—R' (anhydride), Cl (chloride) or —O—R' (esters) and Y is H when the acylated compound is monofunctional and Y is —COOH (acid), —CO—O—R" (esters) when the acylated compound is polyfunctional, wherein R, R' and R" are saturated or unsaturated $C_1$ to $C_{43}$ hydrocarbon chains, optionally functionalised by hydroxyl and/or epoxy functions, and R, R' and R" can be identical or different. In the invention, and throughout the description, the at least partial acylation of at least one of the polyhydroxylated compounds belonging to the group consisting of the polyhydroxylated compounds including glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers, means that this acylation, according to the invention, of said polyhydroxylated compounds is partial or total.

The invention relates to the polyesters of at least one of the at least partially acylated polyhydroxylated compounds belonging to the selected group constituted by glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers, wherein the polyhydroxylated compounds of this group are taken alone or in a mixture, characterised in that said polyesters, alone or in a mixture, of the at least partially acylated compounds, satisfy the following general formulas in which k is the acylation rate between 0.01 and 1, inclusive:

a) for the polyesters of the at least partially acylated glycerol polycarbonates:

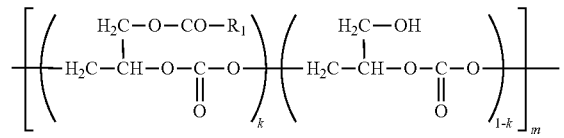

in which "m" is equal to at least 2, which can have a value between 2 and 100, inclusive;

b) for the polyesters of the specific at least partially acylated polyglycerols:

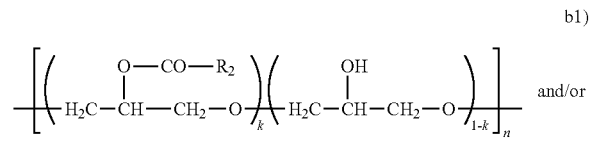

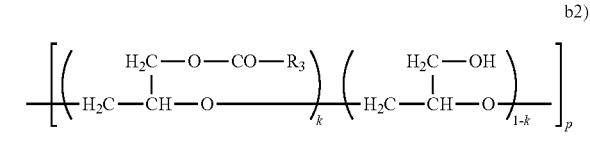

in which "n" and "p" are each equal to at least 2 and have a value between 2 and 150, inclusive.

c) for the polyesters of the at least partially acylated [(α-hydroxymethyl) oxyethylene/(α-hydroxymethyl) ethylene carbonate] copolymers:

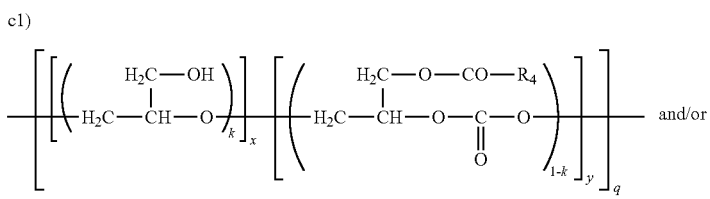

c2)

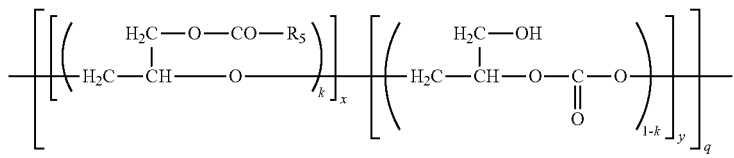

in which "x" is equal to at least 2 and has a value between 2 and 100, inclusive, "y" is equal to at least 2 and has a value between 2 and 100, inclusive, and "q" is equal to at least 2 and has a value between 2 and 100, inclusive;

d) for the polyesters of [(α-alkyl) oxyethylene/(α-alkyl) ethylene carbonate] copolymers in which at least one of α-alkyl 1 or α-alkyl 2 is an at least partially acylated $C_1$ to $C_4$ hydroxylated hydrocarbon chain, while the other α-alkyl is H or a $C_1$ to $C_4$ hydrocarbon chain:

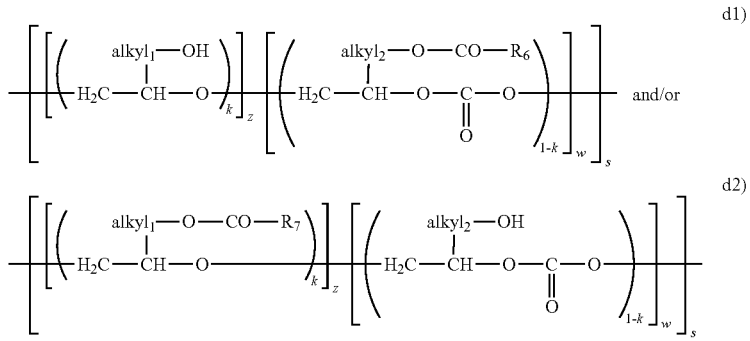

in which "z" is equal to at least 2 and has a value between 2 and 100, "w" is equal to at least 2 and has a value between 2 and 100 and "s" is equal to at least 2 and has a value between 2 and 100;

e) for the polyesters of the at least partially acylated [(α-alkyl)$_3$ oxyethylene/(α-hydroxyalkyl)$_4$ oxyethylene] copolymers represented by the general formula:

e1)

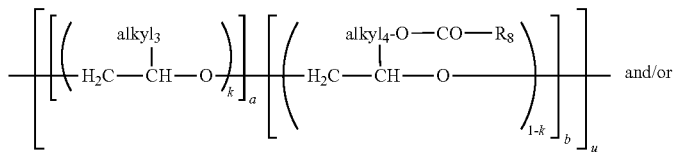

e2)

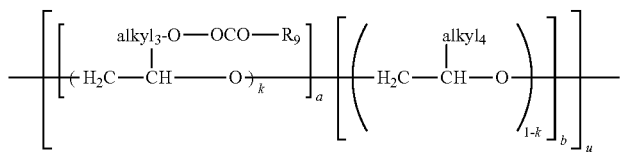

in which "a" is equal to at least 2 and has a value between 2 and 100, "b" is equal to at least 2 and has a value between 2 and 100 and "u" is equal to at least 2 and has a value between 2 and 100, while α-alkyl 3 and α-alkyl 4 are H or a $C_1$ to $C_4$ hydrocarbon chain, and in which $R_1$, $R_2$, $R_3$, $R_4$, $R_5$, $R_6$, $R_7$, $R_8$ and $R_9$ are saturated or unsaturated $C_1$ to $C_{43}$ hydrocarbon chains, optionally functionalised by hydroxyl and/or epoxy functions and can be identical or different.

The invention also relates to a catalytic or non-catalytic method for at least partial acylation of at least one of the polyhydroxylated compounds belonging to the group constituted by glycerol polycarbonates, specific polyglycerols, [(α-hydroxymethyl) oxyethylene/(α-hydroxymethyl) ethylene carbonate] copolymers, [(β-hydroxyalkyl) oxyethylene/(α-alkyl) ethylene carbonate] copolymers, and [(α-alkyl) oxyethylene/(α-hydroxyalkyl) oxyethylene] copolymers, i) alone and after selective separation when said compounds are initially in a mixture, ii) in a homogeneous mixture with glycerol carbonate and/or other organic carbonates, and glycerol and/or other coproducts and/or residual compounds.

The catalytic method, according to the invention, for at least partial acylation of at least one of the polyhydroxylated compounds belonging to the group constituted by glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers is characterised in that the catalytic reaction for at least partial acylation occurs in a biphasic heterogeneous reaction medium, of the liquid/liquid type formed by at least one of the polyhydroxylated compounds to be acylated and an acylation compound of formula Y—R—CO—X, in which X can be —OH (acid), —O—CO—R' (anhydride), Cl (chloride) or —O—R' (esters) and Y is H when the acylated compound is monofunctional and Y is —COOH(acid)-CO—O—R'' (esters) when the acylated compound is polyfunctional, R, R' and R'' are saturated or unsaturated $C_1$ to $C_{43}$ hydrocarbon chains, optionally functionalised by hydroxyl and/or epoxy functions, and R, R' and R'' are identical or different, a reaction medium:
(i) in which the catalyst is dispersed when it is not formed in situ on initiation of the acylation reaction;
(ii) which is brought to a temperature no higher than 220° C.;
(iii) which is subjected to a pressure between $10^5$ Pa and $1.5 \times 10^2$ Pa, during the reaction;
(iv) which is subjected to mechanical agitation throughout the reaction.

The invention also relates to a method for selective extraction of each polyhydroxylated compound belonging to the group constituted by glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers, when these polyhydroxylated compounds are in a mixture, before or after at least partial acylation.

The invention finally relates to numerous applications in which at least one of the aforementioned at least partially polyhydroxylated compounds can be specially used.

DETAILED DESCRIPTION OF THE INVENTION

The polyhydroxylated compounds to be at least partially acylated according to the invention belong to the group constituted by glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers.

Origin of Polyhydroxylated Compounds to be at Least Partially Acylated:

Each of these polyhydroxylated compounds to be at least partially acylated, belonging to the aforementioned selected group, can be obtained by catalytic synthesis, in an isolated manner after extraction or associated with other polyhydroxylated compounds.

If the polyhydroxylated compound to be at least partially acylated is associated with at least one other polyhydroxylated compound, it can originate from a synthetic organic composition containing, in a mixture, glycerol polycarbonates, specific polyglycerols, [(α-hydroxymethyl) oxyethylene/(α-hydroxymethyl) ethylene carbonate] copolymers, optionally [(α-hydroxyalkyl) oxyethylene/(α-alkyl) ethylene carbonate] copolymers, and optionally [(α-alkyl) oxyethylene/(α-hydroxyalkyl) oxyethylene] copolymers, wherein said organic composition is produced, for example, according to the French patent application FR 0408796, by a catalytic polymerisation in a heterogeneous reaction medium comprising an organic liquid phase formed by at least one compound providing hydroxyl functions, which is in particular glycerol and at least one compound providing carbonate functions, which can be urea, glycerol carbonate or an organic carbonate, a solid phase capable of being solubilised or not formed by a catalyst containing active sites in the Lewis or Bronsted sense and an ambient gas phase formed by gas products in situ.

Nevertheless, the organic composition resulting from the aforementioned catalytic polymerisation can also contain glycerol carbonate and/or other organic carbonates, and/or other coproducts and/or residual compounds and glycerol when said glycerol provides hydroxyl functions in particular when the initial amount of the compound providing hydroxyl functions in the reaction medium is unbalanced with respect to the initial amount of the compound providing carbonate functions.

All of these compounds including glycerol carbonate and/or other organic carbonates, and/or other coproducts and/or residual compounds and glycerol are optionally eliminated prior to the at least partial acylation of at least one of the polyhydroxylated compounds belonging to the aforementioned group.

More specifically, the organic composition resulting from the aforementioned catalytic polymerisation, once it has been removed from the glycerol carbonate and/or other organic carbonates, glycerol and coproducts of the polymerisation reaction, is distinguished by the fact that it may contain organic polyhydroxylated compounds to be at least partially acylated in an amount of:
5% by weight to 85% by weight of glycerol polycarbonate;
15% by weight to 50% by weight of specific polyglycerol;
0.1% to 50% by weight of poly[(α-hydroxymethyl) oxyethylene/(α-hydroxymethyl) ethylene carbonate];
0% to 50% by weight of [(α-hydroxyalkyl) oxyethylene/(α-alkyl) ethylene carbonate] copolymers; and
0% to 50% by weight of [(α-alkyl) oxyethylene/(α-hydroxyalkyl) oxyethylene] copolymers.

At Least Partial Acylation of at Least One of the Polyhydroxylated Compounds Belonging to the Selected Group:

The at least partial acylation, according to the invention, of at least one of the polyhydroxylated compounds belonging to the group consisting of glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers, can thus be performed,
on a single one of the polyhydroxylated compounds belonging to the aforementioned selected group, obtained by direct synthesis or by a selective extraction of an organic composition containing, in a mixture with other compounds, the desired polyhydroxylated compound,
on the selected polyhydroxylated compounds belonging to said group, in a mixture in an organic composition resulting from a catalytic polymerisation.

When the at least partial acylation according to the invention concerns only one polyhydroxylated compound, from the aforementioned selected group, obtained in isolation by synthesis, the acylation is performed on this single desired polyhydroxylated compound according to the specific conditions of the at least partial catalytic acylation.

When the at least partial acylation according to the invention concerns only one desired polyhydroxylated compound belonging to the selected group, and the polyhydroxylated compound is contained in a mixture in an organic composition resulting from a catalytic polymerisation, a selective extraction of said desired compound is performed by a separation method known from the prior art, prior to the at least partial acylation of said desired compound.

Such known separation methods are, for example:
gel permeation chromatography (GPC method),
liquid/liquid extraction,
conventional distillation or molecular or "short-path" distillation,
the SMB method known as the "Simulated Moving Bead" method.

Thus, by one of these known methods, it is possible to isolate, then extract, the polyhydroxylated polymers and copolymers to be at least partially acylated, which are present in the organic composition according to the invention, i.e.:
glycerol polycarbonates,
specific polyglycerols
[(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers.

The polyhydroxylated polymers and copolymers to be at least partially acylated, according to the invention, have primarily linear structures. Nevertheless, it is possible to find in said composition polymers and copolymers which are branched, or even cyclic when oligomers are present, or of which the endings of the polymer chains are cyclic.

When the at least partial acylation according to the invention is performed on at least one polyhydroxylated compound belonging to the aforementioned selected group, this at least partial acylation can be performed on an organic composition formed by the mixture of desired polyhydroxylated compounds belonging to the aforementioned group or on an organic composition containing, in a mixture, not only the selected polyhydroxylated compounds including glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers, but also other compounds which are glycerol carbonate and/or other organic carbonates, glycerol and/or other coproducts and/or residual compounds, wherein the at least partial acylation occurs in the presence or after the elimination of glycerol carbonate and/or other organic carbonates, glycerol and/or other coproducts and/or residual compounds.

Thus, according to the invention, the at least partial acylation of at least one of the polyhydroxylated compounds belonging to the aforementioned selected group by creating the corresponding polyesters can be performed on:
one of the polyhydroxylated compounds belonging to the aforementioned selected group,
at least one of the polyhydroxylated compounds belonging to the aforementioned selected group, by producing the desired polyester,
on an organic composition containing, in a mixture, not only the polyhydroxylated compounds belonging to the aforementioned selected group, but also other compounds including glycerol carbonate and/or other organic carbonates, glycerol and/or other coproducts and/or residual compounds,
on an organic composition containing, in a mixture, the only polyhydroxylated compounds, which are polymers and copolymers after having removed this composition from the other compounds,
on an organic composition containing, in a mixture, the only polyhydroxylated compounds, which are glycerol polycarbonates and specific polyglycerols after having removed this composition from the other compounds,
on an organic composition containing, in a mixture, the only glycerol polycarbonates and the associated copolymers after having removed this composition from the other compounds,
on an organic composition containing, in a mixture, glycerol polycarbonates or specific polyglycerols or associated copolymers after having removed this composition from the other compounds.

Below are the types of at least partial acylation.

According to the invention, the at least partial acylation, i.e. partial or total acylation, of at least one of the polyhydroxylated compounds belonging to the group constituted by glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers, which creates the corresponding polyesters, can be:

a simple, partial or total acylation, and involves the reaction of a single acylation compound, which is a carboxylic monoacid with the formula R—COOH or an acid chloride with the formula R—CO—Cl in at least a sub-stoichiometric amount comprising a saturated or unsaturated $C_1$ to $C_{43}$ hydrocarbon chain, optionally functionalised by hydroxyl and/or epoxy functions, with at least one polyhydroxylated compound belonging to the aforementioned selected group, a simple-mixed, partial or total acylation, and involves the reaction of at least two acylation compounds, which are different monocarboxylic acids R—COOH or different acid chlorides R—CO—Cl, in a cumulative amount that is at least sub-stoichiometric, comprising a saturated or unsaturated $C_1$ to $C_{43}$ hydrocarbon chain, optionally functionalised by hydroxyl and/or epoxy functions, in a sub-stoichiometric amount, with at least one polyhydroxylated compound belonging to the aforementioned selected group, a simple-complex, partial or total acylation, and involves the reaction of a single acylation compounds, which is an aliphatic or aromatic carboxylic diacid HO—CO—R—CO—OH or a carboxylic triacid, for example a maleated or fumarated resin acid, or a carboxylic acid anhydride R—CO—O—CO—R', comprising saturated or unsaturated R and R' $C_1$ to $C_{43}$ hydrocarbon chain, optionally functionalised by hydroxyl and/or epoxy functions, in at least a sub-stoichiometric amount, with at least one polyhydroxylated compound belonging to the aforementioned selected group, capable of resulting in:
a partial or total intermolecular acylation by a site-to-site reaction, between each acid site of the dicarboxylic or tricarboxylic acylation compound and a hydroxylated site belonging to distinct chains of polyhydroxylated compounds, which are polyhydroxylated polymers and/or copolymers of the selected group, by first creating a bridge between at least two molecules of at least one of the polyhydroxylated polymers and/or copolymers and at least one acylation compound molecule, then cumulatively a mesh network by other intermolecular reactions,
a partial or total intramolecular acylation by a site-to-site reaction, between the two acid sites of the dicarboxylic or tricarboxylic acylation compound and hydroxylated sites of a chain of polyhydroxylated polymers and/or copolymers of the selected group.

The case of the triacid is also comparable to the above, where inter and intramolecular bonds can occur, with the following types of acylation:
a complex-mixed, partial or total acylation, involving the reaction of at least two acylation compounds, which are different at least dicarboxylic acids H O—CO—R—CO—OH or different carboxylic acid anhydrides R—CO—O—CO—R', comprising saturated or unsaturated R and R' $C_1$ to $C_{43}$ hydrocarbon chain, optionally functionalised by hydroxyl and/or epoxy functions, in at least a sub-stoichiometric amount, with at least one polyhydroxylated compound belonging to the aforementioned selected group, capable of resulting in:

a partial or total intermolecular acylation by a site-to-site reaction, between each acid site of each dicarboxylic or tricarboxylic acylation compound and a hydroxylated site belonging to distinct chains of polyhydroxylated compounds, which are polyhydroxylated polymers and/or copolymers of the selected group, by first creating a bridge between at least two molecules of at least one of the polyhydroxylated polymers and/or copolymers and at least one molecule of each dicarboxylic acylation compound, then cumulatively a mesh network by other intermolecular reactions, a partial or total intramolecular acylation by a site-to-site reaction, between the two acid sites of the dicarboxylic or tricarboxylic acylation compound and hydroxylated sites of the same chain of one of the polyhydroxylated polymers and/or copolymers and between the two acid sites of another of the dicarboxylic acylation compounds and two hydroxylated sites of the same chain or of another chain of one or more of the polyhydroxylated polymers and/or copolymers, a simple, partial or total acylation by transesterification that results from the reaction of an acylation compound, which is a monoester R—CO—O—R' in at least a sub-stoichiometric amount, in which R and R' are saturated or unsaturated $C_1$ to $C_{43}$ hydrocarbon chains, optionally functionalised by hydroxyl and/or epoxy functions, and R and R' can be identical or different, with at least one polyhydroxylated compound belonging to the aforementioned selected group, a simple-mixed, partial or total acylation by transesterification that results from the reaction of at least two acylation compounds, which are monoesters R—CO—O—R' and R'''—CO—O—R''' in at least sub-stoichiometric cumulative amounts, in which R, R', R'' and R''' are saturated or unsaturated $C_1$ to $C_{43}$ hydrocarbon chains, optionally functionalised by hydroxyl and/or epoxy functions, and R, R', R'' and R''' can be identical on the condition that R or R' is different from R'' and R''', or different, with at least one polyhydroxylated compound belonging to the aforementioned selected group, a complex-simple, complex-mixed, partial or total acylation by transesterification that involves the reaction of at least one acylation compound, which is at least one polyester with the formula R'O—CO—R—CO—O—R'', or a monoester of a carboxylic polyacid with the formula R'—O—CO—R—CO—OH in which R, R' and R'' are saturated or unsaturated $C_1$ to $C_{43}$ hydrocarbon chains, in at least sub-stoichiometric amounts, optionally functionalised by hydroxyl and/or epoxy functions, with at least one polyhydroxylated compound belonging to the aforementioned selected group.

In these two types of acylation, the acyl groups are preferably provided by dimer fatty acids, dimer fatty acid partial esters, dimer fatty acid diesters having 2 to 36 carbon atoms, or by trimer fatty acids, trimer fatty acid partial esters, trimer fatty acid triesters from resin acids from pine wood and by any other polyunsaturated fatty acid of plant origin or oxo synthesis.

In this case of complex transesterification, it is possible for the bonds to be intra or intermolecular.

Thus, according to the invention, the at least partial acylation, i.e. the partial or total acylation of at least one of the polyhydroxylated compounds belonging to the selected group, results in at least partially acylated polyesters of the following types: simple, simple-mixed, intermolecular or intramolecular complex-simple, intermolecular or intramolecular complex-mixed or intra or intermolecular simple or simple-mixed transesterified.

Characterisation of Polyesters after at Least Partial Acylation:

Each of the polyesters of the polyhydroxylated compounds belonging to the aforementioned selected at least partially acylated group can be characterised by the detection of its various physicochemical properties. The same is true when the polyesters of polyhydroxylated compounds belonging to the aforementioned selected group are, for at least one of them, at least partially acylated in a mixture in an organic composition resulting from a catalytic polymerisation.

Nevertheless, it is possible to characterise the polyesters of polyhydroxylated compounds, of which at least one is at least partially acylated, by known methods for analysing or measuring specific properties, such as, for example:

by measuring the hydroxyl concentrations in the polyhydroxylated compounds, of the reaction medium before and after the at least partial acylation, which makes it possible to measure the acylation rate, and which also makes it possible to specify the importance of the at least partial acylation (Standard NF T 60/213), by means of the —OH bonds still available, by measuring the viscosity expressed in centistokes (cSt), which is performed before and after the at least partial acylation using a Canon-Fenske viscosimeter at 40° C. (Standard NF T 60/200, NF T 60/136 and ASTM D 445-96), by infrared spectroscopic analysis.

Water-Solubility—Lipid Solubility of Polyesters According to the Invention:

The at least partial acylation, according to the invention, of at least one of the polyhydroxylated compounds belonging to the aforementioned selected group can transform each of these polyhydroxylated compounds, which are initially totally water-soluble, into polyesters that are simple, complex, mixed, partial, total, intermolecular and intramolecular, lipophilic and lipid-soluble in fats, according to the acylation rate "K" applied to each of them, wherein K is in the range $0.01 \leq K \leq 1$, inclusive.

More specifically, the acylation, according to the invention, of the polyhydroxylated compounds of the aforementioned selected group progressively transforms, according to the acylation rate applied, these initially water-soluble polyhydroxylated compounds into fully lipid-soluble and hydrophobic polyesters, after going through intermediate properties of simultaneous water-solubility and lipid-solubility, wherein the intermediate state of water-solubility and lipid-solubility possible reflects the degree of substitution of the hydroxyl groups with acylated groups, which will depend on the polyhydroxylated compound group and the length of the substituent acylation chains.

Each of the polyesters of the at least partially acylated polyhydroxylated compounds can be implemented alone or in the form of a mixture of polyhydroxylated compounds belonging to the aforementioned selected group of which at least one of the polyhydroxylated compounds is at least partially acylated.

Reactivity of Polyesters According to the Invention:

The polyesters, according to the invention, of glycerol polycarbonate, specific polyglycerols and their copolymers are constituted by particularly beneficial reactive sites, which can be used as synthesis intermediates:

a glyceryl skeleton constituted by two oxyethylene/ethylene carbonate units substituted by free hydroxymethyl or acylated hydroxymethyl functions. These acylated hydroxymethyl groups in ester form and the carbonate functions —O(C=O)O represent functionalisable reaction centres.

in the presence of Lawesson's reagent, the carbonate —O(C=O)O and carboxyester (C=O)O— groupings are modified into thionocarbonate —O(C=S)O and thionester (C=S)O— groupings. Thus, glycerol polythionocarbonate polythionesters are formed, and are capable of providing the anti-wear properties and extreme pressure owing to the presence of organic sulphur for lubrication;

the free hydroxymethyl groups are the site of alkylation reactions for obtaining O-alkyl (poly)ester of glycerol polycarbonate polyesters. The C—O-alkyl bond reinforces the thermal, chemical and physical stability of the molecular structure as well as the hydrophobic character;

condensation reactions, because the mobile hydrogen of hydroxymethyl reacts with isocyanato, isothiocyanato functions of (mono-, di-) isocyanates or isothiocyanates to transform the reaction centres into urethane functions. In particular, in the case of partial esterifications, this condensation provides the means to produce glycerol polycarbonate polyester polyurethanes, which can be used in the material, clothing, painting and lubricant industries, etc.;

hydroxy alkylation reactions by implementing the epoxy sites in particular in those provided by epoxidised vegetal oils (epoxidised rapeseed, epoxidised soy, etc.) to transform the reaction centres involved into hydroxy and O-alkyl functions. Polyhydroxylated polycarbonate polyesters and polyethers are expected to result. Their benefit lies in the presence of hydroxyl functions on the hydrocarbon skeleton of short, medium and long chains, from plant material. The high degree of hydroxyl creates oleochemical neopolyols;

the double bonds of oleic and linoleic chains of the ester chains that can be functionalised into epoxides, in the presence, for example, of formic acid and hydrogen peroxide, then transformed into amide with amines and in the presence, for example, of sodium monochloroacetate, can be transformed into quaternary ammonium, a very desirable function owing to its cationicity;

hydroxylation reactions on the ethylenic double bonds of the acyl groups provided by the fatty acids of oleic, erucic, linoleic, linolenic oils to obtain oleochemical polyols with high-hydroxy density.

Catalytic Method for at Least Partial Acylation of at Least One of the Polyhydroxylated Compounds Belonging to the Group of Aforementioned Selected Compounds:

The invention also relates to a catalytic method for at least partial acylation of at least one of the polyhydroxylated compounds belonging to the group constituted by glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers.

i) alone and after selective separation when said compounds are initially in a mixture, ii) in a homogeneous mixture with glycerol carbonate and/or other organic carbonates, glycerol and/or other coproducts and/or residual compounds.

The catalytic method, according to the invention, for at least partial acylation of at least one of the polyhydroxylated compounds belonging to the group constituted by glycerol polycarbonates, specific polyglycerols, [(α-hydroxymethyl) oxyethylene/(α-hydroxymethyl) ethylene carbonate] copolymers, [(α-hydroxyalkyl) oxyethylene/(α-alkyl) ethylene carbonate] copolymers, and [(α-alkyl) oxyethylene/(α-hydroxyalkyl) oxyethylene] copolymers is characterised in that the catalytic reaction for at least partial acylation occurs in a biphasic heterogeneous reaction medium, of the liquid/liquid type formed by at least one of the polyhydroxylated compounds to be acylated, belonging to the aforementioned group, and at least one acylation compound of formula Y—R—CO—X, in which X can be —OH (acid), —O—CO—R' (anhydride), Cl (chloride) or —O—R' (esters) and Y is H when the acylated compound is monofunctional, and is —COOH (acid), —CO—O—R" (esters) when the acylated compound is at least bifunctional, the biphasic heterogeneous reaction medium:

(i) in which the catalyst is dispersed, when it is not formed in situ on initiation of the reaction;
(ii) which is brought to a temperature no higher than 220° C.;
(iii) which is subjected to a pressure between $10^5$ Pa and $1.5 \times 10^2$ Pa, during the reaction;
(iv) which is subjected to mechanical agitation throughout the reaction.

According to the method of the invention, the amounts of polyhydroxylated compounds belonging to the aforementioned selected group providing hydroxyl functions, and of acylation compounds added to the reaction medium are dependent on the desired acylation rate "K" and the hydroxyl concentration of the polyhydroxylated compound to be acylated.

In general, the amount of acylation compound added to the reaction medium is chosen to be between 0.45 times and 6 times the stoichiometric amount for acylation, with the understanding that, in the partial acylation, the acylation reaction is stopped when the desired chemical structure is obtained.

The Acylation Compounds

The acylation compounds Y—R—CO—X involved in the method according to the invention are chosen:

a) in the case of a simple, partial or total acylation, which comprises the reaction of a single acylation compound with at least one of the polyhydroxylated compounds, in the group constituted by monocarboxylic acids with the formula R—COOH, and/or carboxylic acid chlorides with the formula R—CO—Cl in which R is a saturated or unsaturated $C_1$ to $C_{43}$ hydrocarbon chains optionally functionalised by hydroxyl and/or epoxy functions.

b) in the case of a simple-mixed, partial or total acylation, which comprises the reaction of at least two different acylation compounds with at least one of the polyhydroxylated compounds of the selected group, in the group constituted by monocarboxylic acids with the formula R—COOH, and/or carboxylic acid chlorides with the formula R—CO—Cl in which R is a saturated or unsaturated $C_1$ to $C_{43}$ hydrocarbon chains optionally functionalised by hydroxyl and/or epoxy functions.

The monocarboxylic acids are preferably chosen from the group constituted by the fatty acids, in particular those of plant or animal origin with a linear or branched $C_1$ to $C_{43}$ hydrocarbon chain:

saturated: for example, lauric, palmitic or isopalmitic, stearic, arachidic acid, or others, or unsaturated:

with a single unsaturation, such as, for example, oleic acid, erucic acid or others, with a double unsaturation, such as, for example, linoleic acid, or others.

The acid chlorides are preferably those chosen from the group constituted by the aforementioned monocarboxylic acids transformed into acid chloride.

c) in the case of a complex-simple, partial or total acylation, which comprises the reaction of a single acylation compound with at least one of the polyhydroxylated compounds of the selected group, in the group constituted by aliphatic or aromatic carboxylic diacids HO—OC—R—CO—OH or carboxylic, aliphatic or aromatic triacids, such as, for example, a maleated or fumarated resin acid, and/or carboxylic acid anhydrides R—CO—O—CO—R', comprising saturated or unsaturated R and R' $C_1$ to $C_{43}$ hydrocarbon chains, optionally functionalised by hydroxyl and/or epoxy functions, wherein the carboxylic diacids can preferably be chosen from the group of $C_6$ to $C_{21}$ dimer acids and the anhydrides from the group constituted by the $C_2$ to $C_{18}$ fatty acids:

C1) In the case of a partial or total intermolecular acylation, the reaction proceeds by a site-to-site reaction, between each acid site of the dicarboxylic acylation compound and a hydroxylated site belonging to two mutually distinct chains of polyhydroxylated compounds, which are polyhydroxylated polymers and/or copolymers of the selected group, by first creating a bridge by means of the acid functions and the hydroxyl functions between at least two molecules of at least one of the polyhydroxylated polymers and/or copolymers of the selected group, then cumulatively a mesh network by other intermolecular reactions;

C2) in the case of a partial or total intramolecular acylation, the reaction proceeds by a site-to-site reaction, between the two acid sites of the dicarboxylic acylation compound and two hydroxylated sites of a chain of polyhydroxylated polymers and/or copolymers of the selected group.

In these intermolecular and intramolecular acylations, the dicarboxylic acids are preferably chosen from the group constituted by fatty acids such as glutaric, adipic, pimelic, suberic, azelaic, sebacic or tridecanoic acid.

d) in the case of a complex-mixed, partial or total acylation, which comprises the reaction of at least two acylation compounds with at least one of the polyhydroxylated compounds, in the group constituted by different dicarboxylic acids HO—CO—R—CO—OH or carboxylic acid anhydrides R—CO—O—CO—R' different from one another, comprising saturated or unsaturated R and R' $C_1$ to $C_{43}$ hydrocarbon chains, optionally functionalised by hydroxyl and/or epoxy functions, wherein the carboxylic diacids can preferably be chosen from the group of $C_6$ to $C_{21}$ dimer acids and the anhydrides from the group constituted by fatty acids comprising saturated or unsaturated R and R' $C_1$ to $C_{43}$ hydrocarbon chains, optionally functionalised by hydroxyl and/or epoxy functions, wherein the carboxylic acid anhydrides can preferably be chosen from the group of $C_2$ to $C_{18}$ fatty acids. This type of complex-mixed, partial or total acylation can also result in:

d1) a complex-mixed, partial or total intermolecular acylation by a site-to-site reaction, between each acid site of each dicarboxylic acylation compound and a hydroxylated site belonging to two mutually distinct chains of polyhydroxylated polymers and/or copolymers, by first creating a bridge between at least two polyhydroxylated polymer and/or copolymer molecules, then cumulatively a mesh network by other intermolecular reactions, d2) a complex-mixed, partial or total intramolecular acylation by a site-to-site reaction, between the two acid sites of one of the dicarboxylic acylation compounds and two hydroxylated sites of the same chain of one of the polyhydroxylated polymers and/or copolymers and between the two acid sites of another of the dicarboxylic acylation compounds and two hydroxylated sites of the same chain or of another chain of one of the polyhydroxylated polymers and/or copolymers.

In the case of a complex, simple or mixed, partial or total acylation, capable of resulting in intermolecular and/or intramolecular acylations, said acylation is performed:

by at least dicarboxylic acids with the general formula HO—CO—R—CO—OH or by diacid anhydrides with the formula R—CO—O—CO—R':

in which R and R' are saturated or unsaturated $C_1$ to $C_{43}$ hydrocarbon chains, optionally functionalised by hydroxyl and/or epoxy functions, and R and R' can be identical or different, with at least one polyhydroxylated compound belonging to the aforementioned selected group, wherein said at least dicarboxylic acids are preferably chosen from the group constituted by glutaric acid, adipic acid, pimelic acid, suberic acid, azelaic acid, sebacic acid and dodecanedioic acid, and the carboxylic acid anhydrides are preferably chosen from the group constituted by acetic anhydride, hexanoic anhydride and oleic anhydride.

e) in the case of a simple, mixed, partial or total transesterification-type acylation, which comprises the reaction of at least one acylation compound with at least one of the polyhydroxylated compounds:

e1) When the acylation by transesterification is simple, partial or total, which involves the reaction of a single acylation compound with at least one of the polyhydroxylated compounds, in the group constituted by monoesters with the formula R—CO—O—R', in which R and R' are saturated or unsaturated $C_1$ to $C_{43}$ hydrocarbon chains, optionally functionalised by hydroxyl and/or epoxy functions, and R and R' can be different from one another.

e2) When the acylation by transesterification is simple-mixed, partial or total, which involves the reaction of at least two acylation compounds with at least one of the polyhydroxylated compounds in the group constituted by monoesters with the formula R—CO—O—R' and R—CO—O—R" in which R, R' and R" are saturated or unsaturated $C_1$ to $C_{43}$ hydrocarbon chains, optionally functionalised by hydroxyl and/or epoxy functions, and R' and R" must be different from one another.

In the case of a simple, simple-mixed, partial or total transesterification-type acylation, the monoesters are preferably chosen from the group constituted by the coconut oil, palm oil, rapeseed oil, sunflower oil and castor oil methyl esters.

f) in the case of a complex-simple or complex-mixed, partial or total transesterification-type acylation, which involves the reaction of at least one acylation compound with at least one of the polyhydroxylated compounds capable of resulting in inter and/or intramolecular acylations, in the group constituted by at least dicarboxylic acid esters with the formula R—CO—O—R—CO—O—R", or by an acid ester of at least dicarboxylic acids with the formula R—CO—O—R—CO—OH, wherein R, R' and R" are saturated or unsaturated $C_1$ to $C_{43}$ hydrocarbon chains, optionally functionalised by hydroxyl and/or epoxy functions, and R, R' and R" are identical or different.

In the case of a complex-simple or complex-mixed partial or total transesterification-type acylation, the at least dicarboxylic acid esters and the acid esters of at least dicarboxylic acids are preferably chosen from the group constituted by dimer fatty acids, $C_6$ to $C_{21}$ dimer fatty acid diesters, trimer fatty acid esters and trimer acid triesters.

The Catalyst:

The catalyst involved in the catalytic reaction for at least partial acylation, according to the invention, of at least one of the polyhydroxylated compounds belonging to the aforementioned selected group, is chosen according to the nature of the partial or total acylation reaction. Two catalyst groups can be distinguished for the activation of the acylation:

the group of homogenous or heterogeneous monofunctional or bifunctional acid catalysts chosen to activate the acylation of polyhydroxylated compounds with fatty acid chlorides, fatty acid anhydrides, monomer fatty acids, dimer fatty acids and trimer fatty acids. The acylation catalyst can be chosen from the acids providing protons in the family of homogeneous catalysts such as, for example, sulphuric acid, phosphoric acid, sulphonic paratoluene acid, sulphonic dodecyl acid or from the metal catalysts carrying Lewis and Bronsted acid sites such as, for example, in the family of metal sulphates such as zinc sulphate, magnesium sulphate, sodium sulphate or from the cation-exchange resins at strong sulphonic acid sites, nafions or weak carboxylic or phosphonic acid sites, or from zeolites, in particular molecular sieves, pulgites, clays or from superacids such as, for example $FSO_3H$—$SbF_5$ or from polyacids.

the group of homogeneous or heterogeneous monofunctional or bifunctional basic catalysts selected to activate the acylation of polyhydroxylated compounds with fatty acid alkyl monoesters, fatty acid alkyl diesters, fatty acid alkyl triesters, triglycerides, dimer fatty acid diesters and trimer fatty acid triesters. The acylation catalyst is chosen from inorganic solid bases such as alkaline hydroxides, in particular sodium hydroxide and potassium hydroxide, alkaline-earth hydroxides, in particular calcium and barium, alkaline carbonates such as sodium carbonate and potassium carbonate, or from organic solid bases such as metal alcoholates, in particular sodium or potassium methylates, sodium or potassium ethylates, or from the group of alkaline and metal salts, organic carboxylic acids, the group of metal oxides carrying basic Lewis sites such as $TiO2$, $MgO$, $ZnO$ and others, the group of anion-exchange resins functionalised in the form of chloride, hydroxide, bicarbonate or in the form of a free base, and the group of organic bases or hydrogen bond acceptor supported bases, and free amines such as, for example, triethylamine, pyridine, guanidine and others. The catalyst according to the invention is added to the reaction medium in an amount of 0.01% by weight to 5% by weight with respect to the polyhydroxylated compound to be acylated added to the reaction medium.

The Experimental Conditions: Temperature and Pressure:

The acylation reactions are carried out in the absence of a third solvent by a biphasic hydrophobic liquid/hydrophilic liquid system, under synthesis conditions in which the ratio between the acylation sites of the hydrophobic acylating agent and the hydrophilic polyhydroxylated compound sites is equal to at least 1 and is generally no more than 3.

The pressure applied to the reaction medium and controlled during the catalytic acylation is no more than $10^5$ Pa, but it can preferably be below this maximum value so as to move the equilibrium of the reaction between the polyhydroxylated compound and the acylated compound in the direction of the formation of polyesters and in the direction of the elimination of the gas phase that may form in situ. Preferably, the pressure applied to the catalytic reaction medium is between $2.0 \times 10^2$ and $10^5$ Pa.

The temperature to which the reaction medium is brought during the reaction is no higher than 220° C. and is preferably within the range of 50° C. to 200° C.

The biphasic heterogeneous reaction medium is subjected, throughout the acylation reaction, to adequate mechanical agitation by means of known agitation devices.

During such an at least partial acylation, coproducts may appear in the liquid reaction phase, which are an alcohol or an alcohol mixture, or an acid or an acid mixture, optionally to be eliminated as they are produced.

Fields of Use of Polyesters:

The polyesters of polyhydroxylated compounds belonging to the aforementioned selected group, which are at least partially acylated, can be used in numerous applications due to the intrinsic properties of the polyesters resulting from said acylation.

The following can be cited as being among the most important intrinsic properties: the intrinsic lipid-solubility, the multifunctionality of said at least partially or totally acylated polyhydroxylated compounds, their lack of toxicity and ecotoxicity, their biodegradability, their thermal stability and their oxidation resistance, their low volatility, their fire resistance, their thickening and rheological properties, their lubricity (anti-wear, anti-friction, EP additive, extreme pressure), their adjustable solubility ranging from water-solubility to lipid-solubility with surfactant properties in both environments, among others.

Therefore, there are many various applications for polyesters resulting from polyhydroxylated compounds of the aforementioned selected group by at least partial acylation according to the invention.

The following technical fields can be cited, for illustrative purposes, among the possible applications:
engine and industrial lubricants, grease, etc.,
hydraulic fluids,
metalworking and deformation lubricants,
mould extraction and dressing products,
oil exploration, mines, tunnel borers,
cosmetics,
detergents,
inks, paper and textile coatings,
food,
wood production
synthesis intermediates
and many others.

The examples below illustrate the subject matter of the invention, so as to make it easier to understand, but without limiting its scope.

EXAMPLES

In all of the following examples, the at least partial acylation of polyhydroxylated compounds from the aforementioned selected group is performed in the same experimental plant.

To do this, a 250-millilitre reactor is implemented. This reactor is equipped with an agitation device rotating at 300 rpm, a Dean-Stark system series-mounted with internal pressure control means (vacuum pump), means for creating a controlled atmosphere by nitrogen flushing and heating means, all of which means are controlled by control systems.

In all of the following examples, the term "glycerol carbonate oligomers" refers to a reaction medium containing around:

20 to 25% oligomers containing one or more linear carbonate functions belonging to the glycerol polycarbonate structures, and to the [(α-hydroxymethyl) oxyethylene/(α-hydroxymethyl) ethylene carbonate] copolymers;

35 to 40% oligomers not containing carbonated functions, but that are specific polyglycerols;

30% glycerol carbonate not having reacted during the oligomer synthesis,

10% glycerol.

The hydroxide concentration of this medium is 784 mg KOH/g.

Example 1

This example concerns the partial acylation of a glycerol polycarbonate by a lipophilic anhydride, which is maleic anhydride.

The reaction medium is made up of:
25.90 g of glycerol carbonate oligomers, 45.55 g of maleic anhydride,
the acid catalyst is formed in situ upon initiation of the acylation reaction; the presence of an added catalyst is not necessary.

Glycerol polycarbonate is first added to the reactor, and brought to a temperature of 70° C. Then, maleic anhydride, which has been pre-heated so that it is at least partially melted, is added, creating a biphasic mixture.

The mixture thus produced is brought to 80° C. under strong agitation and at a pressure of $10^5$ Pa until the maleic anhydride has fully melted.

The mixture is then brought to 130° C. under sustained agitation and under a pressure of $2 \times 10^2$ Pa for 5 h 30 min.

At the end of the reaction, the reaction mixture is composed of two phases.

The upper phase of the reaction medium analysed in infrared spectroscopy shows that it contains a large proportion of fatty chains, which are not found in the lower phase of the reaction medium. The presence, in the FTIR spectra of the upper phase of the reaction medium, of a frequency band at 1743 $cm^{-1}$, attributable to the ester functions, a frequency band at 1715 $cm^{-1}$, attributable to the carboxylic acid formed in the acid anhydride reaction, and a frequency band at 1801 $cm^{-1}$, attributable to the acid anhydride that did not react, demonstrates that the esterification reaction of the glycerol polycarbonate by the maleic anhydride has clearly taken place.

The partial acylation of glycerol carbonate oligomers by a $C_4$ chain has enabled these compounds to acquire a strongly hydrophobic character, which they did not have at the outset.

Example 2

This example concerns the partial acylation of a glycerol polycarbonate by a lipophilic anhydride, which is oleic anhydride.

The reaction medium is made up of:
25.18 g of glycerol carbonate oligomers having 0.352 mol of —OH function;
99.46 g of oleic acid representing 0.353 mol of acyl function;
0.25 g of catalyst: sulphonic paratoluene acid.

The reaction medium thus produced is brought to a set point temperature of 142° C. under strong agitation and at a pressure of $2.5 \times 10^5$ Pa for 8 h.

The reaction progress is monitored by collecting regular samples from the upper phase of the reaction medium, of which the kinematic viscosity, the hydroxide index and the acid index are measured. Over the course of the reaction, a regular increase in the kinematic viscosity of the samples, a reduction in the acid index and a reduction in the hydroxide index are noted.

At the end of the reaction, the kinematic viscosity measured at 40° C. has increased from 21.8 to 62.6 cSt, and the acid index has decreased from 200 to 83.5. The esterification yield can be calculated and appears to be 58%.

The material recovered in the Dean Stark and in the baffle is weighed and analysed. This recovered material appears to be composed in a large majority (99%) by water essentially from the esterification reaction with traces of glycerol: thus, 4.16 g of water, i.e. 0.288 mol, have been collected, which gives an esterification yield of 64%, comparable to that calculated on the basis of acid indices.

Thus, a partial acylation of the OH functions of glycerol polycarbonate chains by oleic acid has clearly been achieved.

Example 3

This example concerns the partial acylation of a glycerol polycarbonate by transesterification by means of an oleic sunflower methyl ester.

The reaction medium is made up of:
24.94 g of glycerol carbonate oligomers having 0.34 g mol of —OH function;
107.79 g of sunflower methyl ester representing 0.364 mol of acyl function;
1.41 g of catalyst: sodium methylate.

This reaction medium produced in the reactor is brought to a set point temperature of 142° C. under strong agitation at 300 rpm and at a pressure of $2.5 \times 10^5$ Pa for 8 h.

The reaction progress is monitored by collecting regular samples of which the kinematic viscosity and the hydroxide index are measured. The measurements of the acid indices give values that remain near zero over the course of the entire reaction.

Over the course of the reaction, a regular increase in the kinematic viscosity of the samples is noted, while the hydroxide index follows a bell curve. This can be explained by the progressive transfer into the lipophilic phase of weakly acylated glycerol carbonate oligomer chains, then the progressive increase in their acylation rate.

The reaction is stopped after 8 h at the set point temperature: the reaction medium has become almost monophasic. The kinematic viscosity measured at 40° C. has increased from 4.5 to 45.2 cSt and the hydroxide concentration is 34 mg KOH/g.

The material recovered in the Dean Stark and in the baffle is weighed and analysed, and it is found that this material is primarily methanol (91%) with a small amount of water (7%), and traces of glycerol and glycerol carbonate. The methanol collected is from the transesterification reaction of methyl ester by the glycerol carbonate oligomers. 10.2 g of material is collected, i.e. 0.291 mol of methanol, which gives an esterification yield of 83% for the available OH functions.

It is thus proven that a partial transesterification of the sunflower methyl ester by the —OH functions of the glycerol carbonate oligomer chains has clearly been achieved.

Example 4

This example concerns the partial acylation of a glycerol polycarbonate by an interesterification reaction by means of a lipophilic oleic sunflower oil.

The reaction medium is made up of:

25.06 g of glycerol carbonate oligomers having 0.351 g mol of —OH function;

103.5 g of oleic sunflower oil representing 0.351 mol of acyl function;

1.26 g of catalyst: sodium methylate.

This reaction medium is brought to a temperature of 142° C. under strong agitation at 300 rpm and is subjected to a reduced pressure of $2.5 \times 10^2$ bars.

The reaction is stopped after 8 h at the set point temperature. The kinematic viscosity measured at 40° C. has increased from 41.4 to 158.7 cSt.

The small amount of material recovered in the Dean Stark is analysed, and it is found that this material is composed primarily of glycerol and glycerol carbonate.

Example 5

This example concerns the partial acylation of a glycerol polycarbonate by a consecutive esterification reaction by means of a mixture of two lipophilic acids.

The reaction medium is made up of:

40.96 g of glycerol carbonate oligomers having 0.573 g mol of —OH function;

98.07 g of a mixture composed of 50% by weight of oleic acid and 50% by weight of tridecanedioic acid representing 0.576 mol of acyl function;

0.41 g of catalyst: sulphonic paratoluene acid.

The reaction medium is brought to a set point temperature of 142° C. under strong agitation and is subjected to a reduced pressure of $2.5 \times 10^2$ Pa.

The reaction is stopped after 8 h at the set point temperature: the reaction medium has become totally monophasic. After cooling, the reaction medium has the consistency of grease.

The acid index decreases from 328 to 121. This decrease in the index gives an esterification yield of 50%, taking into consideration the fact that there is only one phase.

The material recovered in the Dean Stark and in the baffle is weighed and analysed, and it is found that this material is in a large majority water (97%), with traces of glycerol. This water comes essentially from the esterification reaction. 5.64 g of material is collected, i.e. 0.304 mol of water, which gives an esterification yield of 53% for the available OH functions, a result comparable to that calculated on the basis of acid indices.

Thus, a partial esterification of the OH functions of glycerol carbonate oligomer chains by oleic acid has clearly been achieved.

Example 6

This example concerns the total acylation of glycerol polycarbonate by acetic anhydride.

The reaction medium is made up of:

22.5 g of glycerol carbonate oligomers having 0.315 g mol of —OH function;

85 g of acetic anhydride representing 0.315 mol of acyl function;

an added catalyst is unnecessary because the reaction catalyst is formed in situ on initiation of the acylation reaction.

This reaction medium produced in the reactor is brought to a set point temperature of 50° C. under strong agitation at 300 rpm and at a pressure of $2.5 \times 10^2$ Pa for 2 h 30 min.

At the end of the reaction, the pressure in the reactor is maintained at $2.5 \times 10^2$ Pa and the temperature is also maintained at 50° C. until distillation of the acetic acid formed during the acylation.

The measurement of the hydroxyl concentration of the final acylated reaction medium, after deducting the influence of the residual acetic acid, gives a zero result proving that the acylation of the OH functions of the oligomerised medium is complete.

An IR spectrum of the acylated reaction medium shows the appearance of a frequency band 1743 $cm^{-1}$, attributable to the ester functions and a frequency band at 1715 $cm^{-1}$, attributable to the carboxylic acid formed in the acid anhydride reaction.

10 g of the esterified reaction medium are mixed with 50 ml of water and 50 ml of hexane in a separatory funnel, and subjected to vigorous agitation. The aqueous phase and the organic phase are recovered separately and evaporated in the rotatory evaporator. The results of the evaporations each give a respectively hydrophilic and lipophilic fraction. The mass of the lipophilic fraction recovered is much lower than that of the hydrophilic fraction.

The IR analysis of the recovered fractions shows that the two fractions are composed of esters, and that the hydrophilic fraction contains cyclic carbonate functions, while the lipophilic fraction does not contain them.

The acylation by esterification of the glycerol carbonate polymers by a $C_2$ chain enables these compounds to acquire a hydrophobic character.

Example 7

This example concerns the total acylation of glycerol polycarbonate by means of caproic anhydride.

The reaction medium is made up of:

20.0 g of glycerol carbonate oligomers having 0.28 g mol of —OH function;

132 g of caproic anhydride representing 0.28 mol of acyl function;

an added catalyst is unnecessary because the reaction catalyst is formed in situ on initiation of the acylation reaction.

The reaction is brought, for 4 h 30 min, under agitation, to a temperature of 110° C. The pressure in the reactor during the reaction is reduced to $2 \times 10^2$ Pa so as to move the reaction in the direction of the formation of ester, by distillation of the caproic acid formed during the acylation.

An IR spectrum of the esterified reaction medium shows the appearance of a frequency band 1743 $cm^{-1}$, attributable to the ester functions, a frequency band at 1715 $cm^{-1}$, attributable to the carboxylic acid formed as a result of the acid anhydride reaction, and a frequency band at 1810 $cm^{-1}$, attributable to the acid anhydride, which has not reacted.

Next, 10 g of the acylated reaction medium are mixed with 50 ml of water and 50 ml of hexane in a separatory funnel, and subjected to vigorous agitation. The aqueous phase and the organic phase are recovered separately and evaporated in the rotatory evaporator. The results of the evaporations each give a respectively hydrophilic and lipophilic fraction. The mass of the lipophilic fraction recovered is much higher than that of the hydrophilic fraction.

The infrared analysis of the recovered fractions shows that the two fractions are composed of esters.

The esterification of the glycerol carbonate polymers by a $C_6$ chain has enabled these compounds to acquire a strongly hydrophobic character that they did not previously have.

Example 8

This example concerns the partial acylation on a semi-industrial scale of glycerol polycarbonate (GPC) by means of sunflower oil with 90% oleic acid (pilot production P1) or propane trimethylol oleate (pilot production P2).

The reaction medium (P1) is made up of:
glycerol carbonate oligomers (GPC)
oleic sunflower oil
and catalyst (sodium methylate).

Each compound of the reaction medium is used in amounts proportional to those of example 4.

The reaction medium (P2) is made up of:
glycerol carbonate oligomers (GPC)
propane trimethylol oleate
and catalyst (sodium methylate).

Each compound of the reaction medium is used in amounts proportional to those of example 4.

The process conditions are based on those of example 4:
the reactor used contains 50 litres and is equipped with a double wall enabling homogeneous control of the temperature of the reaction medium at 142° C.±1° C.
the reduced pressure to which the reaction medium is subjected is $3 \times 10^2$ Pa, by a liquid ring pump.
the reaction medium is subjected to a double agitation by an anchor/scraper rotating at 40 rpm and a dispersion device, which is a toothed disk rotating at 1500 rpm.

This strong, double agitation makes it possible to effectively disperse the droplets of the initial hydrophilic reaction mixture in a lipophilic medium (sunflower oil) and with solid catalysts. This explains the faster kinetics, the higher esterification yield and more beneficial lipophilic properties (solubility, thickening ability, etc.):

The progress of the reaction is evaluated indirectly by the solubilisation of the GPC in the sunflower oil and by the "stabilisation" of the viscosity of the reaction medium.

This stabilisation is obtained after 2 to 6 hours.

At the end of the reaction, i.e. when the stabilisation of the viscosity of the reaction medium has been noted, the final reaction medium is observed, and measurements are taken of the viscosity at 40° C. as well as the hydroxyl index, to be compared with the hydroxyl index of the glycerol and the glycerol polycarbonate implemented in the acylation.

The observations and results are presented in the table (1) below:

TABLE 1

|  | Pilot test P1 | Pilot test P2 |  |  |
|---|---|---|---|---|
| Aspect | Sunflower oil with 90% oleic acid | Propane trimethylol oleate | Glycerol | Glycerol polycarbonate |
| Final reaction medium | Homogeneous 1 phase | Homogeneous 1 phase |  |  |
| Viscosity at 40° C. in cSt* | 310 | 2500 |  |  |
| Hydroxyl index in mg KOH/g | 160 | 120 | 650 | 785 |

*viscosity at 40° C. of high-oleic acid sunflower oil is 40 cSt.

The changes in viscosities and hydroxyl indices clearly prove the at least partial acylation, according to the invention, of the glycerol polycarbonate with an organic acid.

Example 9

Application of esters, according to the invention, in lubrication: these esters are in a mixture in high-oleic acid sunflower oil free of any other performance additive.

a) Thickening Properties:

The esters according to the invention from example 8 (P1) are totally soluble in natural or synthetic petroleum lubricant bases. They are tested in dilution in high-oleic acid sunflower oil.

In the field of industrial lubricants, the viscosity is a fundamental parameter and determines the thickness of the lubricating film. A range of viscosities is offered to users, with each viscosity corresponding to a specific application: an ISO classification based on the viscosity (ISO 3448) of industrial lubricants exists and makes it possible to differentiate these lubricants from one another. For example, the indication "ISO 46" means that the lubricant thus identified has a kinematic viscosity of 46 cSt with a deviation of ±10%, measured at 40° C.

Thus, to have a classification of grade ISO46 or ISO68, the high-oleic acid sunflower oil is mixed with the reaction medium according to the necessary amount of said reaction medium in order to obtain a viscosity of 46 cSt of the mixture at a temperature of 40° C. for grade ISO46 and to obtain a viscosity of 68 cSt of the mixture at the same temperature for grade ISO68.

Finally, the ester according to the invention is subjected as is to a viscosity measurement at 100° C. and at 40° C.

All of the experimental data is presented in table 2.

b) Anti-Wear and Extreme Pressure Properties:

These properties were measured by a machine called a "four-ball test machine", after standards ASTM D4172 and D2783, respectively. After the test, in the presence of lubricants, the wear mark of a ball (in mm) under a constant load (40 kg), rotating over 3 balls, or the welding load of the balls (increasing load) is determined. The following tests were conducted with steel balls 100C6 in comparison with high-oleic acid sunflower oil.

c) Low-Temperature Rheological Properties:

The flow point of glycerol polycarbonate polyesters (P1) of example 8 according to standard ASTMD97 was determined.

All of the experimental results have been presented in table 2 below, and it appears that the results concerning the glycerol polycarbonate polyesters are better than those concerning the control, namely sunflower oil.

All of the experimental data is presented in table 2.

TABLE 2

|  | ISO46 | ISO68 | High-oleic acid sunflower oil |
|---|---|---|---|
| Viscosity at 40° C. (cSt) | 44 | 62 | 39.7 |
| Viscosity at 100° C. (cSt) | 8.9 | 11 | 8.7 |
| Viscosity index (VI) | 188 | 172 | 207 |
| Wear (mm) | 0.5-0.6 | 0.5-0.6 | 0.6-0.7 |
| Extreme pressure (kg) | 160-170 | 160-170 | 120-130 |
| Flow point (° C.) | −19 | −21 | −15 |

It is noted that all of the tests conducted with the ester according to the invention provide results at least equal to those obtained with the control, but almost always higher than those of the control.

Example 10

Flame Resistance (Esters from Example 8-P1)
a) Spray test "heat release of a stabilised flame" ("European Commission" 7th edition Report of Luxembourg: Requirements and tests applicable to flameproof liquids used for mechanical transmissions and controls (hydrostatic and hydrokinetic).

The principle is as follows: In a combustion chamber with circulating air, a spray composed of liquid (product to be tested) and pressurised air is exposed to a flame defined by a gas burner. The temperatures of the smoke and the gases at the outlet and of the air at the inlet with and without the spray are measured, and a flammability index (RI) is determined. At the same time, the flame length (RL), the optical density of the smoke, and so on, are measured, primarily according to the first two parameters.

b) A flammability danger classification is given in the following table: the higher the RI or the RL is, the more flameproof the hydraulic fluid is and the lower its flame length is.

TABLE 3

Flammability (main classification)

| | Class | | | | | | |
|---|---|---|---|---|---|---|---|
| | A | B | C | D | E | F | G | H |
| Flammability index RI | >100 | 100-80 | 79-65 | 64-50 | 49-36 | 35-25 | 24-14 | <14 |
| Flame length RL | >100 | 100-56 | 55-51 | 50-11 | 10-7 | <7 | | |

The ester according to the invention was tested in a mixture with high-oleic acid sunflower oil of grades ISO46 and ISO68, by comparison with this same high-oleic acid sunflower oil.

All of the experimental data is presented in table 4.

TABLE 4

| | RI and class | RL and class |
|---|---|---|
| High-oleic acid sunflower oil | 10 class H | 7 class E |
| ISO46 with esters | 11 class H | 8 class E |
| ISO68 with esters | 14 class G | 8 class E |

The results of this table show that the increase in the amount of ester in the high-oleic acid sunflower oil (from ISO46 to ISO68) improves the flammability of the mixture subjected to the flameproof test, not only by the implementation of polyester according to the invention, but also by the increase in its concentration in the medium, going from ISO46 to ISO68.

b) The combustion heat (kJ/g) was also measured according to standard ASTM D240. The combustion heat characterises the heat energy released by a burning compound. The higher this value is, the better fuel this compound is and the more the "fire" is maintained by this factor, which is the temperature, because each compound has its flame temperature. These combustion heat measurements were taken not only on the ester according to the invention alone or in a mixture with high-oleic acid sunflower oil, but also on typical products.

All of the combustion heat results are provided in table 5.

TABLE 5

| Samples | Combustion heat (kJ/g) |
|---|---|
| Mineral oils | 44 |
| Heptane | 40.2 |
| Vegetal esters | 39.2 |
| Phosphate esters | 34.8 |

TABLE 5-continued

| Samples | Combustion heat (kJ/g) |
|---|---|
| High-oleic acid sunflower oil | 39.6 |
| Ester (example 8 - P1) | 36.8 |
| Composition, according to the invention, of example 8 - P1 in a mixture in high-oleic acid sunflower oil of grade ISO46 | 39.2 |
| Composition, according to the invention, of example 8 - P1 in a mixture in high-oleic acid sunflower oil of grade ISO68 | 38 |

Example 11

Separation of Components of a Mixture by "Molecular" or "Short-Path" Distillation The glycerol polycarbonate polyester (GPCP) of example 8 (P1) is in fact a crude reaction medium resulting from the interesterification reaction between the glycerol polycarbonate (GPC) and the high-oleic acid sunflower oil (HOSO) in a 25/75 ratio.

As the composition, according to the invention, of example 8-P1 is made up of glycerol polycarbonate esters, glycerol polycarbonate, high-oleic acid sunflower oil and other compounds resulting from the reaction, a molecular or "short-path" distillation is performed, which method consists of separating the constituents present in the composition according to the invention, by their specific boiling points. Molecular distillation is distinguished from conventional distillation by the fact that the distance between the heating component that brings each constituent to a boil and the cooling component that condenses and collects each constituent is equal to the mean free path of each constituent in the gas state.

The molecular distillation apparatus used is a laboratory-type model, referenced KDT6 with a theoretical flow rate of 2 Kg/h as marketed by the U.I.C. company (GMBH).

The distillation plant was placed under a vacuum (reduced pressure) of $10^2$ Pa, then the temperature, to cause distillation, was brought from 110° C. to 200° C. in increments of 10° C.: distillation began to appear at 200° C.

The quantitative results and conditions of this distillation are presented in table 6.

TABLE 6

| Temperature ° C. | Pressure mb | Distillate (g) | Residue (g) | Flow rate (g/h) |
|---|---|---|---|---|
| 200 | $5 \times 10^2$ | 20 | 172 | 600 |
| 220 | $5 \times 10^2$ | 35.5 | 123.2 | 476 |
| 250 | $5 \times 10^2$ | 74.5 | 115.24 | 517 |

The fractions for each temperature level of the distillates and residues in table 6 were characterised by measuring their viscosity at 40° C., and by measuring their hydroxyl index, by comparison with the glycerol polycarbonate (GPC) implemented in the esterification of example 8-P1 and glycerol.

All of the characterisation results have been presented in table 7.

TABLE 7

| Temperature °C. | Viscosity cSt at 40° C. Distillates | Hydroxyl index Distillates (mg KOH/g) | Hydroxyl index Residues (mg KOH/g) |
|---|---|---|---|
| Test 110-200 | 310 | 405 | 129 |
| 200 | 320 | 450 | 131 |
| 220 | 340 | 425 | 152 |
| 250 | 285 | 415 | 156 |
| GPC |  | 784 |  |
| Glycerol |  | 651 |  |

These results show:
- that with these hydroxyl index values and associated viscosity values, the distillates are partial esters of GPC with comparable molecular masses (same viscosity) but the boiling points of which differ due to different chemical structures.
- that the residues are fundamentally different from the distillates, closer to total esters having low hydroxyl indices, and a viscosity that increases as a function of the distillation temperature.
- that each residue is potentially chemically and physically different since the thickening ability of each of them, when implemented in an amount of 5% by weight, in the bases of the following table 8, is different.

TABLE 8

| Bases (Mixture = 5% residue/base) | Residue 200° C. | | | Residue 250° C. | |
|---|---|---|---|---|---|
|  | Viscosity of the base in cSt | Viscosity of the mixture in cSt | Increase in thickening ability of mixture in % | Viscosity of the mixture in cSt | Increase in thickening ability of mixture in % |
| Mineral base 150 SN | 30 | 34 | 13 | 43 | 43 |
| Polyalphaolefin PAO10 | 63 | 69 | 9.5 | 106 | 68 |
| Naphthenic T9 | 9 | 11 | 22 | 13 | 44 |
| Propane trimethylol oleate | 46 | 55 | 19.6 | 70 | 52 |
| HO sunflower oil | 40 | 60 | 50 |  |  |
| Methyl oleate | 5 | 6.2 | 24 | 6 | 20 |
| Octyl oleate | 9 | 11 | 22 | 11 | 22 |
| Isopropyl oleate | 5 | 10 | 100 | 6 | 20 |
| Sorbitan monooleate | 296 | 298 | 0 | 297 | 0 |
| Pentaerythritol oleate | 67 | 78 | 16 | 76 | 13 |
| Glycol neopentyl oleate | 29 | 35 | 21 | 44 | 52 | ing of glycerol polycarbonates, specific polyglycerols, [(α-hydroxymethyl) oxyethylene/(α-hydroxymethyl)ethylene carbonate] copolymers, [(α-alkyl) oxyethylene/(α-alkyl)ethylene carbonate] copolymers, and [(α-hydroxyalkyl) oxyethylene/(α-hydroxyalkyl) oxyethylene] copolymers, wherein the polyhydroxylated compounds of this group are taken alone or in a mixture, and wherein the polyesters of the partially acylated compounds, alone or in a mixture, satisfy the following general formulas in which k is the acylation rate between 0.01 and 1, according to:

ii. for the polyesters of the specific partially acylated polyglycerols:

b1)
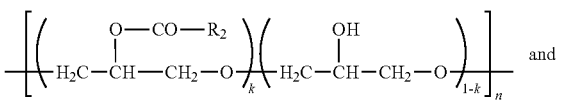

and b2)
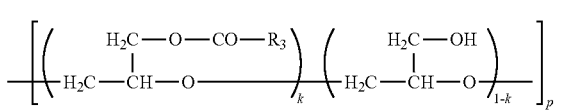

wherein "n" and "p" are each an integer equal to at least 2 and have a value ranging from 2 to 150;

The invention claimed is:

1. A polyester comprising at least one partially acylated polyhydroxylated compound selected from the group consistiii. for the polyesters of the partially acylated [(α-hydroxymethyl) oxyethylene/α-hydroxymethyl)ethylene carbonate] copolymers:

(c1)
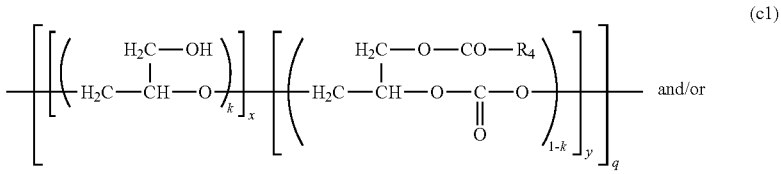

and/or

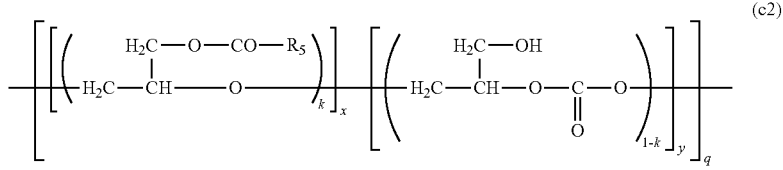
(c2)

wherein "x" is an integer equal to at least 2 and has a value ranging from 2 to 100, wherein "y" is an integer equal to at least 2 and has a value ranging from 2 to 100, and wherein "q" is equal to at least 2 and has a value ranging from 2 to 100;

iv. for the polyesters of [(α-alkyl) oxyethylene/(α-alkyl) ethylene carbonate] copolymers in which at least one of α-alkyl 1 or α-alkyl 2 is a partially acylated $C_1$ to $C_4$ hydroxylated hydrocarbon chain, while the other α-alkyl is H or a $C_1$ to $C_4$ hydrocarbon chain:

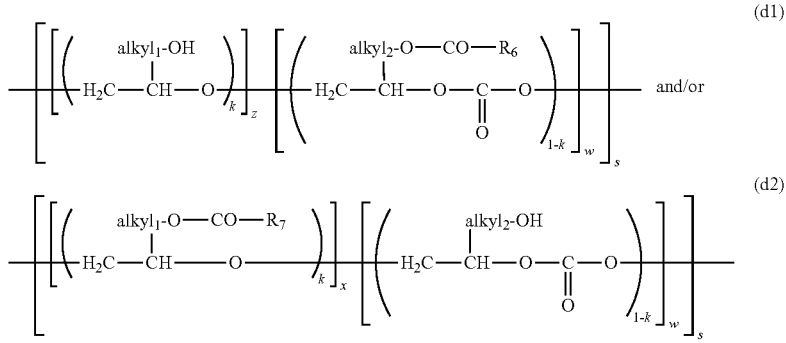

(d1)

and/or (d2)

wherein "z" is an integer equal to at least 2 and has a value ranging from 2 to 100, "w" is an integer equal to at least 2 and has a value ranging from 2 to 100, and "s" is an integer equal to at least 2 and has a value ranging from 2 to 100;

v. for the polyesters of the partially acylated [(α-alkyl)$_3$ oxyethylene/(α-hydroxyalkyl)$_4$ oxyethylene] copolymers represented by the general formula:

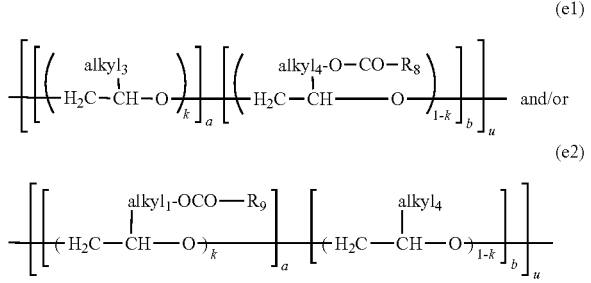

(e1)

and/or (e2)

wherein "a" is an integer equal to at least 2 and has a value ranging from 2 to 100, "b" is an integer equal to at least 2 and has a value ranging from 2 to 100, and "u" is an integer equal to at least 2 and has a value ranging from 2 to 100, while α-alkyl 3 and α-alkyl 4 are H or a $C_1$ to $C_4$ hydrocarbon chain, and in which $R_1$, $R_2$, $R_3$, $R_4$, $R_5$, $R_6$, $R_7$, $R_8$ and $R_9$ are independently selected from the group consisting of saturated or unsaturated $C_1$ to $C_{43}$ hydrocarbon chains, and are optionally functionalised by hydroxyl and/or epoxy functions.

2. The polyester of claim 1, wherein the $R_1$ to $R_9$ hydrocarbon chains have a number of carbons ranging from 1 to 43.

3. The polyester of claim 1, wherein it is produced from the simple, partial or total acylation reaction between at least one of the polyhydroxylated compounds of the selected group and an acylation compound chosen from the group consisting of carboxylic monoacids R—COOH, and carboxylic acid chlorides R—COCl, wherein R is a saturated or unsaturated $C_1$ to $C_{43}$ hydrocarbon chain, optionally functionalised by hydroxyl and/or epoxy functions.

4. The polyester of claim 1, wherein it is produced from the simple-mixed, partial or total acylation reaction between at least one of the polyhydroxylated compounds of the selected group and at least two acylation compounds chosen from the group consisting of monocarboxylic acids R—COOH that are different from one another, and acid chlorides R—CO—Cl, wherein R is a saturated or unsaturated $C_1$ to $C_{43}$ hydrocarbon chain, optionally functionalised by hydroxyl and/or epoxy functions.

5. The polyester of claim 1, wherein it is produced from the complex-simple, partial or total acylation reaction between at least one of the polyhydroxylated compounds of the selected group and a single acylation compound chosen from the group consisting of aromatic or aliphatic carboxylic diacids HO—CO—R—CO—OH, and carboxylic acid anhydrides R—CO—O—CO—R', comprising saturated or unsaturated R and R' $C_1$ to $C_{43}$ hydrocarbon chains, optionally functionalised by hydroxyl and/or epoxy functions.

6. The polyester of claim 5, wherein it is produced from the complex-simple, partial or total acylation reaction, by bridging of acid functions and hydroxyl functions between at least two molecules, wherein at least one of the molecules is a polyhydroxylated compound and at least one molecule is one of the acylation compounds.

7. The polyester of claim 5, wherein it is produced from the complex-simple, partial or total acylation reaction, by bridging between two hydroxylated sites of the same polyhydroxylated polymer and/or copolymer molecule of the group selected by means of the two acid functions of the acylation compound.

8. The polyester of claim 1, wherein it is produced from the complex-mixed, partial or total acylation reaction between at least one polyhydroxylated compound of the selected group and at least two different acylation compounds chosen from the group consisting of different dicarboxylic acids HO—CO—R—COOH and different carboxylic acid anhydrides R—CO—O—CO—R', comprising saturated or unsaturated R and R' $C_1$ to $C_{43}$ hydrocarbon chain, optionally functionalised by hydroxyl and/or epoxy functions.

9. The polyester of claim 8, wherein it is produced from the complex-simple, partial or total acylation reaction, by bridging of hydroxyl functions between at least two molecules, wherein at least one of the molecules is a polyhydroxylated polymers or copolymers of the group selected, and at least one of the molecules is comprised of a combination of at least two different acylation compounds one belonging to the group of dicarboxylic acids and another belonging to the group of carboxylic acid anhydrides bridged by means of acid functions and hydroxyl functions.

10. The polyester of claim 8, wherein it is produced from the complex-simple, partial or total acylation reaction, by a site-to-site reaction between the two acid sites of one of the dicarboxylic acylation compounds and two hydroxylated sites of the same chain of one of the polyhydroxylated polymers and/or copolymers and between the two acid sites of another of the dicarboxylic acylation compounds and two hydroxylated sites of the same chain or of another chain of one or more of the polyhydroxylated polymers and/or copolymers.

11. The polyester of claim 1, wherein it is produced from the simple acylation reaction by partial or total transesterification between at least one of the polyhydroxylated compounds of the selected group and an acylation compound chosen from the group consisting of monoesters with the formula R—CO—O—R' in which R and R' are saturated or unsaturated $C_1$ to $C_{43}$ hydrocarbon chains, optionally functionalised by hydroxyl and/or epoxy functions.

12. The polyester of claim 11, wherein the monoesters are chosen from the group consisting of methyl esters of coconut oil, palm oil, rapeseed oil, sunflower oil and castor oil.

13. The polyester of claim 1, wherein it is produced from the simple-mixed, partial or total transesterification acylation reaction between at least one of the polyhydroxylated compounds of the selected group and at least two acylation compounds, which are monoesters R—CO—O—R' and R"—CO—O—R'" in which R, R', R" and R'" are saturated or unsaturated $C_1$ to $C_{43}$ hydrocarbon chains, optionally functionalised by hydroxyl and/or epoxy functions, and R, R', R"" and R'" can be identical on the condition that R or R' is different from R" and R'", or different.

14. The polyester of claim 1, wherein it is produced from the complex-simple, partial or total transesterification acylation reaction between at least one of the polyhydroxylated compounds of the selected group and at least one acylation compound, which comprises at least one diester with the formula R'—CO—O—R—CO—O—R", or a monoester of a carboxylic diacid with the formula R'—O—CO—R—CO—OH in which R, R' and R" are saturated or unsaturated $C_1$ to $C_{43}$ hydrocarbon chains, optionally functionalised by hydroxyl and/or epoxy functions, and R, R' and R" can be identical or different, with at least one polyhydroxylated compound belonging to the aforementioned selected group.

15. The polyester of claim 1, wherein the hydrocarbon chains R, R', R" and R'" are saturated or unsaturated $C_1$ to $C_{43}$ chains, optionally functionalised by hydroxyl and/or epoxy functions.

16. A method for the synthesis of a molecule comprising: catalyzing at least partial acylation of a polyhydroxylated compound belonging to the group consisting of glycerol polycarbonates, specific polyglycerols, [(α-hydroxymethyl) oxyethylene/(α-hydroxymethyl)ethylene carbonate] copolymers, [(α-hydroxyalkyl) oxyethylene/(α-alkyl)ethylene carbonate] copolymers, and [(α-alkyl) oxyethylene/α-hydroxyalkyl) oxyethylene] copolymers, wherein the catalytic reaction occurs in a biphasic heterogeneous reaction medium formed by at least one of the polyhydroxylated compounds to be acylated and at least one acylation compound of formula Y—R—CO—X, in which X can be —OH (acid), Cl (chloride) or —O—R' (esters) and Y is H when the acylated compound is monofunctional, and is —COOH (acid), —CO—O—R" (esters) when the acylated compound is at least bifunctional, the biphasic heterogeneous reaction medium:
(i) in which the catalyst is dispersed, when it is not formed in situ on initiation of the reaction;
(ii) which is brought to a temperature no higher than 220 C;
(iii) which is subjected to a pressure between $10^5$ Pa and $1.5 \times 10^2$ Pa, during the reaction;
(iv) which is subjected to mechanical agitation throughout the reaction; and
(v) wherein over the course of the reaction, the kinematic viscosity is increased.

17. The method according to claim 15, wherein the amount of acylation compound implemented is between 0.4 and 6 times the stoichiometric amount for one mole of polyhydroxylated compound.

18. The method according to claim 16, wherein the polyhydroxylated compounds to be partially acylated form a homogeneous mixture
(i) of which at least one of the compounds is extracted before acylation by selective separation, then is partially acylated; and
(ii) wherein the homogeneous mixture is subjected to at least partial acylation followed by the extraction of at least one partially acylated polyhydroxylated compound.

19. The method according to claim 18, wherein the catalytic acylation reaction of at least one of the polyhydroxylated compounds is simple, partial or total and is carried out by means of the acylation compound Y—R—CO—X chosen from the group consisting of carboxylic monoacids R—COOH and/or carboxylic acid chlorides R—CO—Cl, in which R is a saturated or unsaturated $C_1$ to $C_{43}$ hydrocarbon chain, optionally functionalised by hydroxyl and/or epoxy functions.

20. The method according to claim 18, wherein the catalytic acylation reaction of at least one of the polyhydroxylated compounds is mixed, partial or total and is carried out by means of at least two different acylation compounds with the formula Y—R—CO—X, chosen from the group consisting of carboxylic monoacids R—COOH and/or carboxylic acid chlorides in which R is a saturated or unsaturated $C_1$ to $C_{43}$ hydrocarbon chain, optionally functionalised by hydroxyl and/or epoxy functions.

21. The method according to claim 20, wherein the carboxylic monoacids are chosen from the group consisting of fatty acids of plant or animal origin with a linear or branched saturated $C_1$ to $C_{43}$ hydrocarbon chain comprising at least one of lauric, palmitic, stearic or arachidic acid, and a monounsaturated $C_1$ to $C_{43}$ hydrocarbon chain comprising at least one of oleic or erucic acid, or polyunsaturated, in particular linoleic acid.

22. The method according to claim 20, wherein the carboxylic acid chlorides are chosen from the group consisting of the fatty acid chlorides of plant or animal origin with a linear or branched saturated $C_1$ to $C_{43}$ hydrocarbon chain, in particular lauric, palmitic, stearic or arachidic acid, or monounsaturated, in particular oleic or erucic acid, or polyunsaturated, in particular linoleic acid.

23. The method according to claim 18, wherein the catalytic acylation reaction of at least one of the polyhydroxylated compounds is complex-mixed, partial or total and is carried out by means of a single acylation compound chosen from the group consisting of aliphatic or aromatic carboxylic diacids HO—CO—R—CO—OH, aliphatic or aromatic carboxylic triacids and/or carboxylic acid anhydrides R—CO—O—CO—R' comprising saturated or unsaturated R and R' $C_1$ to $C_{43}$ hydrocarbon chain, optionally functionalised by hydroxyl and/or epoxy functions.

24. The method according to claim 23, wherein the catalytic acylation is by a reaction between each acid site of the acylation compound with a hydroxyl site on two mutually distinct chains of polyhydroxylated compounds by creating an intermolecular bridge.

25. The method according to claim 23, wherein the catalytic acylation is, by a reaction between each acid site of the acylation compound with two hydroxyl sites of the same chain of at least one of the polyhydroxylated.

26. The method according claim 25, wherein the dicarboxylic acids are chosen from the group consisting of glutaric, adipic, pimelic, suberic, azelaic, sebacic or tridecanoic acids.

27. The method according to claim 18, wherein the catalytic acylation reaction of at least one of the polyhydroxylated compounds is complex-mixed, partial or total and is carried out by means of at least two acylation compounds chosen from the group consisting of aliphatic or aromatic carboxylic diacids HO—CO—R—CO—OH and carboxylic acid anhydrides R—CO—O—CO—R' comprising saturated or unsaturated R and R' $C_1$ to $C_{43}$ hydrocarbon chains, optionally functionalised by hydroxyl and/or epoxy functions.

28. The method according to claim 27, wherein the catalytic acylation is by a site-to-site reaction between each acid site of the dicarboxylic acylation compound and a hydroxylated site belonging to two distinct chains of polyhydroxylated polymers and/or copolymers, by first creating a bridge between at least two molecules of polyhydroxylated polymers and/or copolymers, with each dicarboxylic acylation compound, then cumulatively a mesh network by other intermolecular reactions.

29. The method according to claim 27, wherein the catalytic acylation is by a site-to-site reaction between the two acid sites of one of the dicarboxylic acylation compounds and two hydroxylated sites of the same chain of at least one of the polyhydroxylated polymers and/or copolymers and between the two acid sites of another of the dicarboxylic acylation compounds and two hydroxylated sites of the same chain of one of the polyhydroxylated polymers and/or copolymers.

30. The method according to claim 29, wherein the carboxylic diacids are chosen from the group wherein $C_6$ to $C_{21}$ dimer fatty acids.

31. The method according to claim 29, wherein the carboxylic acid anhydrides are chosen from the group of saturated or unsaturated $C_1$ to $C_{43}$ fatty acids hydrocarbon chain, optionally functionalised by hydroxyl and/or epoxy functions, and preferably at $C_2$ to $C_{18}$.

32. The method according to claim 18, wherein the catalytic acylation reaction of at least one of the polyhydroxylated compounds is a simple, partial or total transesterification, which is carried out by means of an acylation compound chosen from the group consisting of monoesters R—CO—O—R', in which R and R' are saturated or unsaturated $C_1$ to $C_{43}$ hydrocarbon chains, optionally functionalised by hydroxyl and/or epoxy functions.

33. The method according to claim 18, wherein the catalytic acylation reaction of at least one of the polyhydroxylated compounds is a simple-mixed, partial or total transesterification, which is carried out by means of at least two acylation compounds chosen from the group consisting of monoesters R—CO—O—R' and R—CO—O—R", in which R, R' and R" are saturated or unsaturated $C_1$ to $C_{43}$ hydrocarbon chains, optionally functionalised by hydroxyl and/or epoxy functions.

34. The method according claim 18, wherein the catalytic acylation reaction of at least one of the polyhydroxylated compounds is a complex-simple or complex-mixed, partial or total transesterification, which is carried out by means of at least one at least dicarboxylic acid polyester R'—O—CO—R—CO—O—R" or at least one acid ester of at least dicarboxylic acids R'—O—CO—R—CO—OH, wherein R, R' and R" are saturated or unsaturated $C_1$ to $C_{43}$ hydrocarbon chains, optionally functionalised by hydroxyl and/or epoxy functions, and R, R' and R" are identical or different.

35. The method according to claim 34, wherein the at least dicarboxylic acid polyesters and the acid esters of at least dicarboxylic acids are chosen from the group consisting of $C_6$ to $C_{21}$ dimer fatty acids or dimer fatty acid diesters.

36. The method according to claim 35, wherein the catalyst involved in the acylation reaction is chosen from the group of homogenous or heterogeneous, monofunctional or bifunctional, inorganic or organic catalysts to activate the acylation of polyhydroxylated compounds with acid chlorides, acid anhydrides, monomer fatty acids, dimer fatty acids and trimer fatty acids.

37. The method according to claim 36, wherein the acid catalyst is chosen from the group consisting of acids, in particular sulphuric acid, phosphoric acid, sulphonic paratoluene acid, sulphonic dodecyl acid or from the metal catalysts carrying Lewis and Bronsted acid sites comprising at least one of metal sulphates, zinc sulphate, magnesium sulphate, sodium sulphate or the cation-exchange resins with strong sulphonic acid sites, nafions or weak carboxylic or phosphonic acid sites, or from zeolites, molecular sieves, pulgites, clays or superacids, $FSO_3H$—$SbF_5$ or polyacids.

38. The method according to claim 35, wherein the catalyst involved in the acylation reaction is chosen from the group of homogeneous or heterogeneous, monofunctional or bifunctional, inorganic or organic basic catalysts to activate the acylation of polyhydroxylated compounds with fatty acid alkyl monoesters, fatty acid alkyl diesters, fatty acid alkyl triesters, triglycerides, dimer fatty acid diesters and trimer fatty acid triesters.

39. The method according to claim 38, wherein the catalyst is chosen from the group consisting of homogeneous or heterogeneous, monofunctional or bifunctional basic catalysts to activate the acylation of polyhydroxylated compounds with fatty acid alkyl monoesters, fatty acid alkyl diesters, fatty acid alkyl triesters, triglycerides, dimer fatty acid diesters and trimer fatty acid triesters, by the inorganic solid bases, alkaline hydroxides, and more specifically sodium hydroxide and potassium hydroxide, alkaline-earth hydroxides, calcium and barium, alkaline carbonates, sodium carbonate and potassium carbonate, or from organic solid bases, in particular metal alcoholates, and more specifically sodium or potassium methylates, sodium or potassium ethylates, or from the group of alkaline and metal salts, organic carboxylic acids, the group of metal oxides carrying basic Lewis sites, $TiO_2$, $MgO$ and $ZnO$, the group of anion-exchange resins functionalised in the form of chloride, hydroxide, bicarbonate or in the form of a free base, and the group of organic bases or hydrogen bond acceptor supported bases, and free amines, triethylamine, pyridine and guanidine.

40. The method according to claim 39, wherein the catalyst involved in the acylation reaction is added to the reaction medium in an amount of 0.01% by weight to 5% by weight with respect to the polyhydroxylated compound to be acylated.

41. The method according to claim 40, wherein the pressure applied to the catalytic reaction medium during the acylation reaction is preferably between $2.0 \times 10^2$ and $10^5$ Pa.

42. The method according to claim 41, wherein the temperature to which the reaction medium is brought during the acylation reaction is chosen to be within the range of 50° C. to 200° C.

43. The polyester according to claim 1, wherein the polyester is a component of at least one of a motor vehicle lubricant, an industrial lubricant, a lubricating grease, a lubricant intended for metalworking and deformation, a hydraulic fluid, a flameproof fluid, a mould extraction and dressing agent, a lubricant used for oil exploration, mining, tunnel boring, an ink, paper and textile coatings, a food additive, products for wood treatment, additives for drilling mud, detergents, thickeners, cosmetics or chemical synthesis intermediates.

44. A composition comprising
(A) a polyester comprising at least one partially acylated polyhydroxylated compound selected from the group consisting of glycerol polycarbonates, specific polyglycerols, [(α-hydroxymethyl) oxyethylene/(α-hydroxymethyl)ethylene carbonate] copolymers, [(α-alkyl) oxyethylene/(α-alkyl)ethylene carbonate] copolymers, and [(α-hydroxyalkyl) oxyethylene/(α-hydroxyalkyl) oxyethylene] copolymers, wherein the polyesters of the partially acylated compounds satisfy the following general formulas in which k is the acylation rate between 0.01 and 1, according to:

i. for the polyesters of the partially acylated glycerol polycarbonates:

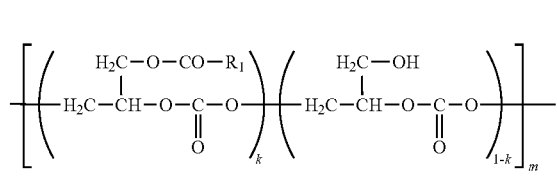

(a)

wherein "m" is an integer equal to at least 2, and which has a value ranging from 2 to 100;

ii. for the polyesters of the specific partially acylated polyglycerols:

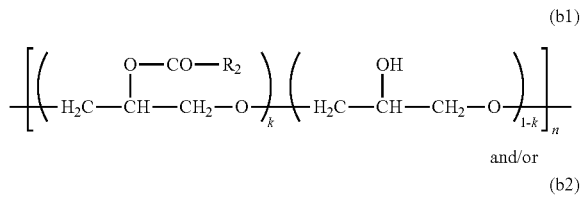

(b1)

and/or

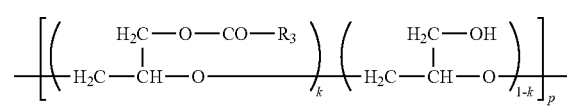

(b2)

wherein "n" and "p" are each an integer equal to at least 2 and have a value ranging from 2 to 150;

iii. for the polyesters of the partially acylated [(α-hydroxymethyl) oxyethylene/α-hydroxymethyl)ethylene carbonate] copolymers:

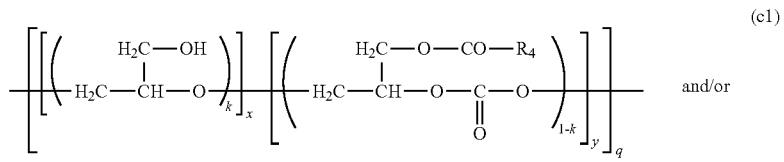

(c1)

and/or

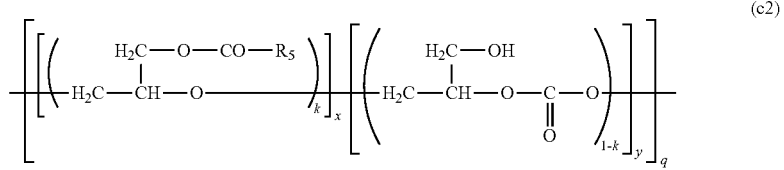

(c2)

wherein "x" is an integer equal to at least 2 and has a value ranging from 2 to 100, wherein "y" is an integer equal to at least 2 and has a value ranging from 2 to 100, and wherein "q" is equal to at least 2 and has a value ranging from 2 to 100;

iv. for the polyesters of [(α-alkyl) oxyethylene/(α-alkyl) ethylene carbonate] copolymers in which at least one of α-alkyl 1 or α-alkyl 2 is a partially acylated $C_1$ to $C_4$ hydroxylated hydrocarbon chain, while the other α-alkyl is H or a $C_1$ to $C_4$ hydrocarbon chain:

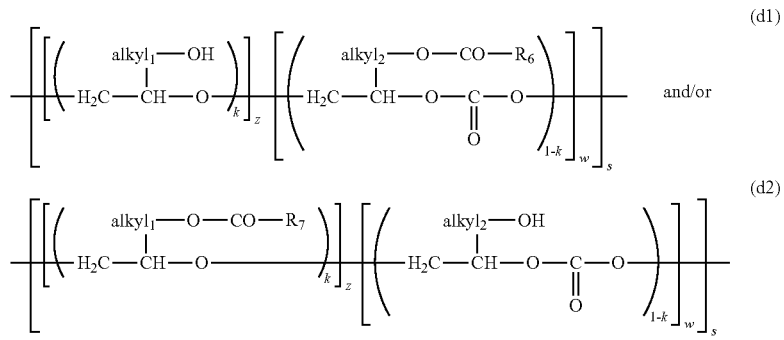

(d1) and/or (d2)

wherein "z" is an integer equal to at least 2 and has a value ranging from 2 to 100, "w" is an integer equal to at least 2 and has a value ranging from 2 to 100, and "s" is an integer equal to at least 2 and has a value ranging from 2 to 100;

v. for the polyesters of the partially acylated [(α-alkyl)$_3$ oxyethylene/(α-hydroxyalkyl)$_4$ oxyethylene] copolymers represented by the general formula:

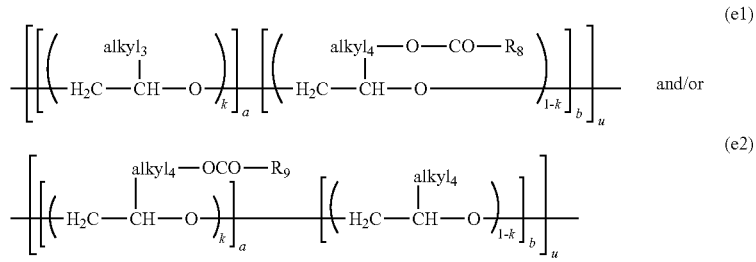

(e1) and/or (e2)

wherein "a" is an integer equal to at least 2 and has a value ranging from 2 to 100, "b" is an integer equal to at least 2 and has a value ranging from 2 to 100, and "u" is an integer equal to at least 2 and has a value ranging from 2 to 100, while α-alkyl 3 and α-alkyl 4 are H or a $C_1$ to $C_4$ hydrocarbon chain, and in which $R_1$, $R_2$, $R_3$, $R_4$, $R_5$, $R_6$, $R_7$, $R_8$ and $R_9$ are independently selected from the group consisting of saturated or unsaturated $C_1$ to $C_{43}$ hydrocarbon chains, and are optionally functionalised by hydroxyl and/or epoxy functions, and (B) a mixture of organic compounds resulting from a catalytic polymerisation.

45. The composition of claim 44, wherein the mixture of organic compounds resulting from a catalytic polymerisation comprises a component selected from the group consisting of oligomers containing one or more linear carbonate functions belonging to glycerol polycarbonate structures, oligomers containing one or more linear carbonate functions belonging to [(α-hydroxymethyl) oxyethylene/(α-hydroxymethyl)ethylene carbonate] copolymers; polyglycerols, glycerol carbonate, and glycerol.

* * * * *

UNITED STATES PATENT AND TRADEMARK OFFICE
CERTIFICATE OF CORRECTION

PATENT NO.           : 7,928,183 B2
APPLICATION NO.      : 11/794111
DATED                : April 19, 2011
INVENTOR(S)          : Nguyen Truong Dinh, Zephirin Mouloungui and Philippe Marechal Page 1 of 1

It is certified that error appears in the above-identified patent and that said Letters Patent is hereby corrected as shown below:

Col. 31, Claim 1:
Change the polyester (e2) in approximately line 53 "$alkyl_1$-OCO" to "$alkyl_4$-OCO".

Col. 33, Claim 9:
Change "polymers or copolymers of the group selected" in line 14 to "polymer or copolymer of the group selected".

Col. 33, Claim 13:
Change "and R, R', R'''' . . ." in line 48 to "and R, R', R''' . . . ."

Col. 35, Claim 25:
Change "acylation is, by a reaction" in line 22 to "acylation is by a reaction".

Col. 37, Claim 42:
Change "the range of 50° C. to" in line 28 to "the range of 50° C to".

Signed and Sealed this
Twenty-third Day of August, 2011

David J. Kappos
*Director of the United States Patent and Trademark Office*